United States Patent
Larsen et al.

(10) Patent No.: US 9,406,462 B2
(45) Date of Patent: Aug. 2, 2016

(54) TRUSS INTERCONNECT

(71) Applicant: The Boeing Company, Chicago, IL (US)

(72) Inventors: Ty Aaby Larsen, Everett, WA (US); Todd Burton Brouwer, Duvall, WA (US); Robert T Johnson, Everett, WA (US); Mark Eugene Liffring, Seattle, WA (US); Mark Stephen Shander, Mill Creek, WA (US); Robert Dennis Holley, Seattle, WA (US); Margaret L. Douglas, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 220 days.

(21) Appl. No.: 13/930,024

(22) Filed: Jun. 28, 2013

(65) Prior Publication Data
US 2015/0004834 A1  Jan. 1, 2015

(51) Int. Cl.
*H01R 13/52* (2006.01)
*H01H 19/62* (2006.01)
*B64C 1/18* (2006.01)

(52) U.S. Cl.
CPC .................. *H01H 19/62* (2013.01); *B64C 1/18* (2013.01); *B64D 2221/00* (2013.01); *Y02T 50/433* (2013.01)

(58) Field of Classification Search
CPC ........ H01R 29/00; H01R 24/58; H01R 11/18; H01R 13/18; H01R 13/645; H01R 13/6453; H01R 24/66; H01R 27/00; H01R 39/56; H01H 19/62; B64C 1/18; Y02T 50/433; B64D 2221/00

USPC ......... 439/592, 166, 170–175, 956, 218, 219, 439/593

See application file for complete search history.

(56) References Cited

U.S. PATENT DOCUMENTS

| | | | | |
|---|---|---|---|---|
| 2,441,461 | A * | 5/1948 | Wayne | 439/115 |
| 2,968,705 | A | 1/1961 | Martz et al. | |
| 3,828,301 | A * | 8/1974 | Neidecker | 439/265 |
| 3,945,294 | A | 3/1976 | Jarman | |
| 3,973,818 | A * | 8/1976 | Soquenne | 439/115 |
| 4,626,052 | A * | 12/1986 | Rumble | 439/173 |
| 4,880,395 | A * | 11/1989 | Eriksson et al. | 439/507 |
| 5,290,191 | A * | 3/1994 | Foreman | G06F 21/00 439/225 |
| 6,382,996 | B1 * | 5/2002 | Eyman | 439/172 |
| 6,497,586 | B1 * | 12/2002 | Wilson | 439/532 |

(Continued)

FOREIGN PATENT DOCUMENTS

| | | |
|---|---|---|
| GB | 1394339 A | 5/1975 |
| GB | 1547714 A | 6/1979 |

OTHER PUBLICATIONS

European Patent Office, extended European search report, Application No. 14167127.1-1808 / 2827454, dated May 11, 2015.

*Primary Examiner* — Neil Abrams
*Assistant Examiner* — Travis Chambers
(74) *Attorney, Agent, or Firm* — Patterson + Sheridan, LLP

(57) ABSTRACT

An interconnect for transferring signals herein includes one or more signal contacts to transfer the power or data to or from an integrated truss system. An interconnect may be configured to transfer power or data between layers of the integrated truss system or within the same layer of the integrated truss system. An interconnect may be configured with one or more compression mechanisms that secure the interconnect in the integrated truss system.

27 Claims, 19 Drawing Sheets

(56) References Cited

U.S. PATENT DOCUMENTS

| | | | |
|---|---|---|---|
| 6,755,694 B2* | 6/2004 | Ries et al. | 439/668 |
| 6,945,803 B2* | 9/2005 | Potega | 439/218 |
| 7,587,873 B2 | 9/2009 | Mesherry et al. | |
| 7,780,386 B2* | 8/2010 | Lau | H01R 13/622 411/7 |
| 7,819,676 B1 | 10/2010 | Cardoso et al. | |
| 8,430,686 B2* | 4/2013 | Sheehan | H01R 13/64 439/551 |
| 2007/0254509 A1* | 11/2007 | Fan et al. | 439/171 |
| 2010/0213312 A1 | 8/2010 | Robb | |
| 2011/0011627 A1* | 1/2011 | Aspas Puertolas | H05K 1/142 174/251 |
| 2011/0031350 A1 | 2/2011 | Sayilgan et al. | |

* cited by examiner

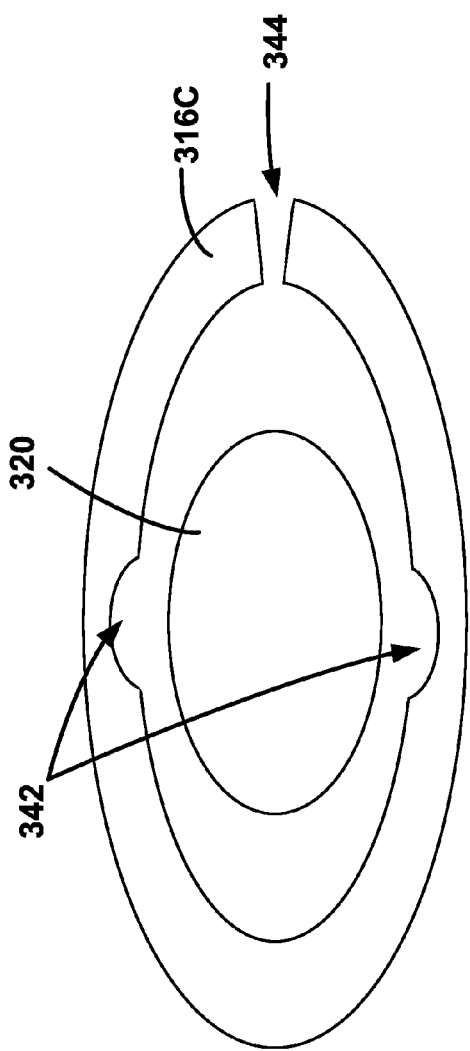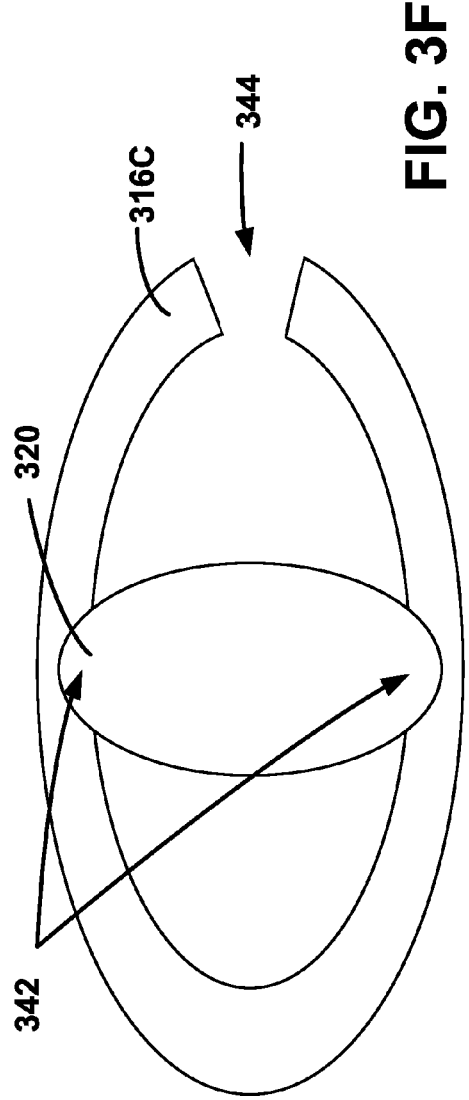

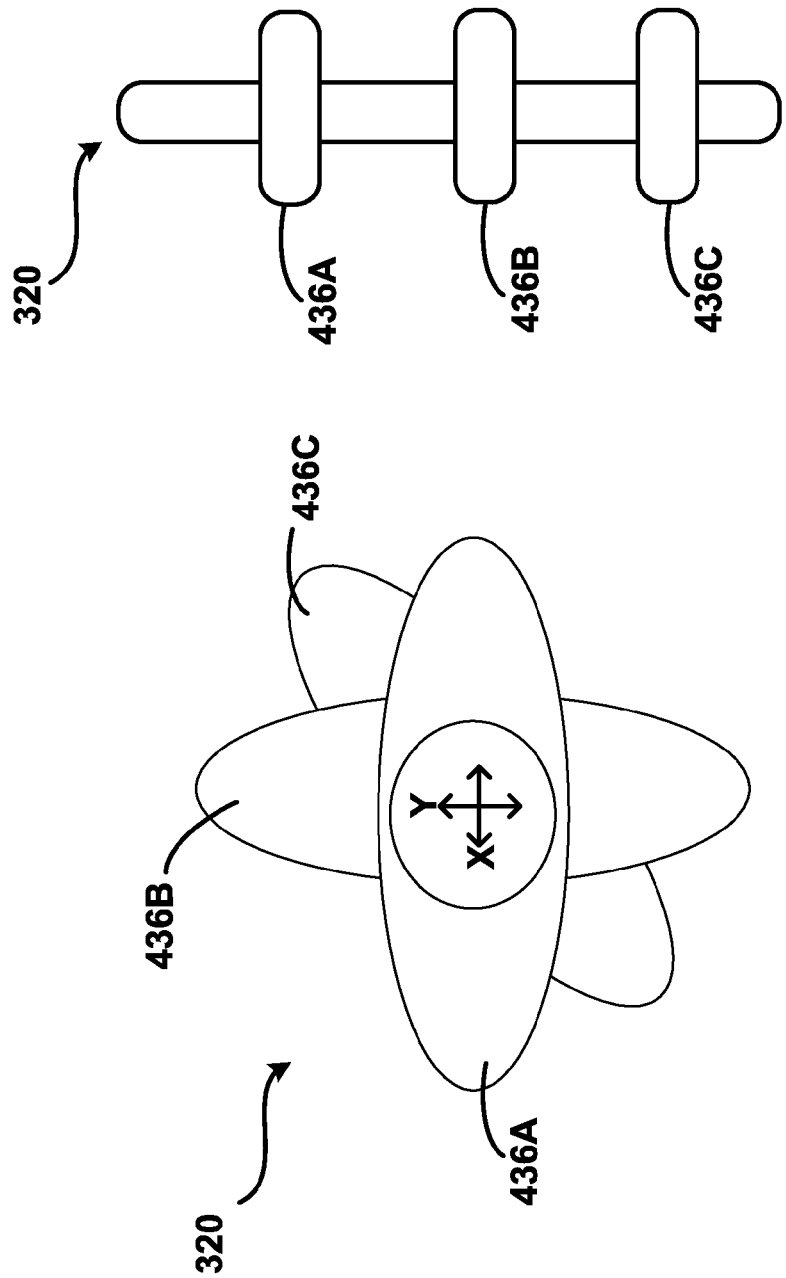

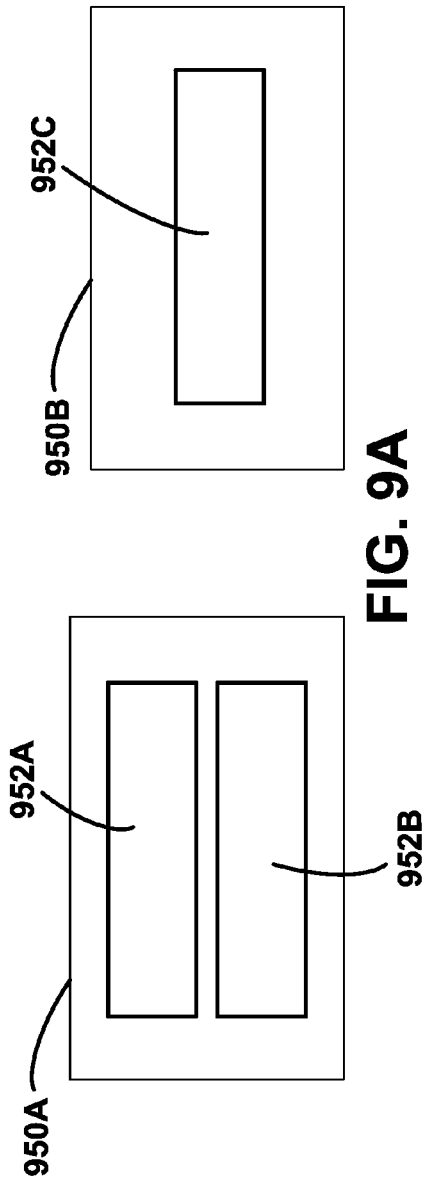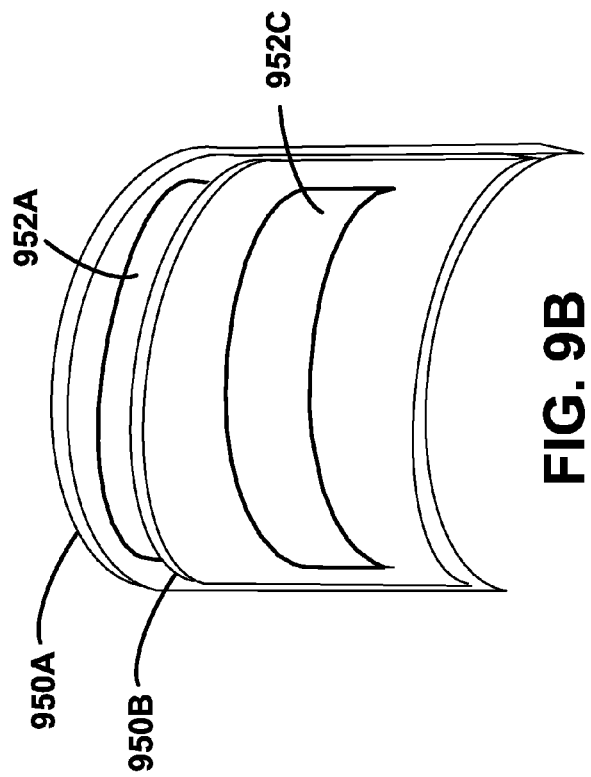

TRUSS INTERCONNECT

BACKGROUND

The design of electrical power and data distribution systems varies from vehicle to vehicle and from manufacturer to manufacturer. With aircraft, for example, a conventional power distribution system includes one or more onboard generators that supply electrical power to forward and aft electrical and environmental bays ("E/E bays"). Power is routed through power cables from the E/E bays to various loads proximate to the E/E bays.

Conventional data distribution systems typically include a vast array of data cables that form a data network. One or more centralized computers control the various computing systems onboard the aircraft. Because of size and other manufacturing constraints, the power and data cables are often routed together in bundles through apertures in the frame of the aircraft. Routing the cables together can reduce the number of apertures or through-hole openings in the frame, thereby reducing the effect on the integrity and strength of the frame due to the cable runs. However, routing cables through the frame remains problematic.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect, an interconnect for use in an integrated truss system is provided. The interconnect includes a compression component having a length, a first orientation and a second orientation. The interconnect further includes one or more signal contacts having a first positional state and a second positional state. The one or more signal contacts are disposed adjacent to a portion of an outer surface of the interconnect and along at least a portion of the length. The interconnect also includes one or more non-electrical pads having the first positional state and the second positional state. The non-electrical pads are interspersed between at least a portion of the signal contacts for mechanical securement. When the compression component is in the first orientation, at least a portion of the signal contacts or at least a portion of the non-electrical pads are in the first positional state. When the compression component is in the second orientation, at least a portion of the signal contacts or at least a portion of the non-electrical pads are in the second positional state.

According to another aspect of the disclosure herein, a method for transferring a signal between levels of an integrated truss system is provided. The method includes receiving a signal from a first truss level into a first signal contact of a first interconnect level of the interconnect, transferring the signal from the first interconnect level to a second interconnect level of the interconnect, and outputting the signal from a second signal contact of the second interconnect level to a second truss level.

According to yet another aspect, an electrical system is provided. The system includes an integrated truss system that includes a plurality of insulating levels for electrical isolation and a plurality of transfer levels for transferring energy. The system also includes an interconnect. The interconnect includes a compression component having a length, a first orientation and a second orientation. The interconnect further includes a plurality of signal contacts having a first positional state and a second positional state. The plurality of signal contacts are disposed adjacent to a portion of an outer surface of the interconnect and along at least a portion of the length. The interconnect also includes a plurality of non-electrical pads having the first positional state and the second positional state. The plurality of non-electrical pads are interspersed between at least a portion of the signal contacts for mechanical securement. When the compression component is in the first orientation, at least a portion of the signal contacts or at least a portion of the non-electrical pads are in the first positional state. When the compression component is in the second orientation, at least a portion of the signal contacts or at least a portion of the non-electrical pads are in the second positional state.

The features, functions, and advantages discussed herein can be achieved independently in various embodiments of the present disclosure as taught herein, combinations thereof, or may be combined in yet other embodiments, further details of which can be seen with reference to the following description and drawings.

BRIEF DESCRIPTION OF THE DRAWINGS

FIGS. 3A-3F are illustrations showing various aspects of interconnects that may provide both electrical and mechanical securement capabilities, according to various embodiments.

FIG. 4A is top down view of a compression component, according to various embodiments.

FIG. 4B is a side view of a compression component, according to various embodiments.

FIG. 9A is a side view of truss sleeves that may be used to form an interconnect, according to various embodiments.

FIG. 9B is a side view of abutted truss sleeves used to form an interconnect, according to various embodiments.

DETAILED DESCRIPTION

Figure 1:
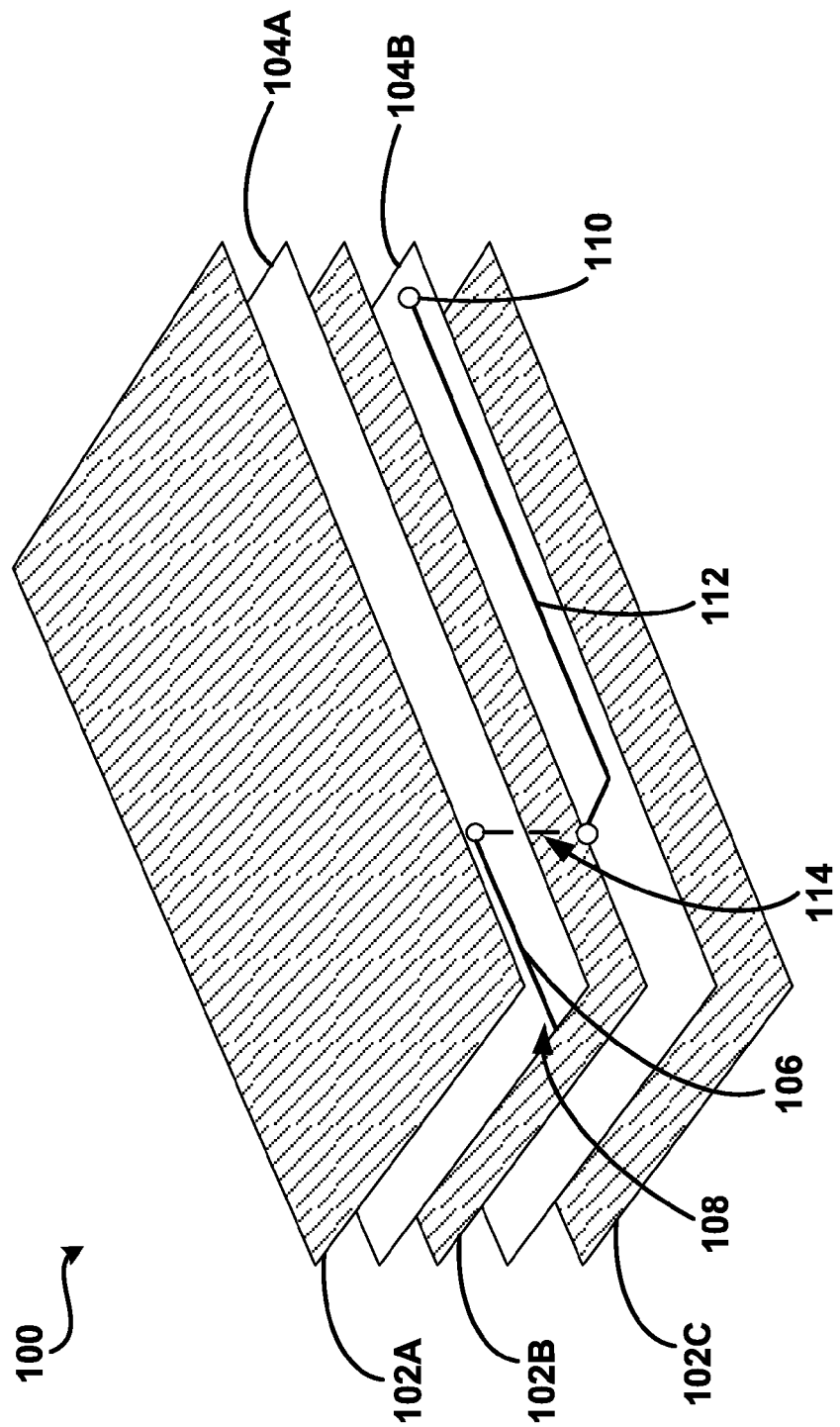
FIG. 1 is an exploded, perspective view of a portion of an integrated truss system, according to various embodiments.

The following detailed description is directed to an interconnect for use in a layered, integrated truss system of an aircraft or other vehicle or structure. An integrated truss system can include one or more data and/or power layers separated by one or more insulation layers. In an aircraft, at least a portion of the power or data transferred to various locations of the aircraft can be transferred by means of an integrated truss system, as will be explained in further detail below. In some configurations, a truss interconnect can electrically connect one or more power or data lines in one layer of an integrated truss system to one or more power or data lines to one or more different layers of the integrated truss system. In some configurations, the integrated truss system may electrically connect both power and data systems. In further configurations, the truss interconnect can provide a mechanical connection between one or more layers of the integrated truss system. In additional configurations, the truss interconnect may be configured for multiple insertions and extractions, allowing the reuse of the truss interconnect.

In the following detailed description, references are made to the accompanying drawings that form a part hereof, and in which are shown by way of illustration specific embodiments or examples. Referring now to the drawings, in which like numerals represent like elements throughout the several figures, aspects of a truss interconnect will be presented.

FIG. 1 is an exploded, perspective view of a portion of an integrated truss system 100 in which a truss interconnect may be used. It should be noted that the figures provided herein are described in terms of a use within an aircraft; however, the present disclosure is not limited to an aircraft, as the present disclosure may be used in other vehicles or structures. Any description using an aircraft is for illustrative purposes only and is not an intent to limit the scope of the presently disclosed subject matter to aircraft.

The integrated truss system 100 may be used in aircraft construction to provide one or more energy transfer paths. For example, the integrated truss system 100 may be configured to transfer a signal. As used herein, a "signal" may include, but is not limited to, electrical power generated by a power unit or data providing communication between one or more systems in the aircraft. In some configurations, the signal transfer path may include both power and data on the same transfer path, such as a power line carrier network system. In some configurations, the integrated truss system 100 includes one or more power or data transfer paths within the integrated truss system 100 to transfer power or data between levels of the integrated truss system 100. In some configurations, various aspects of the integrated truss system 100 may be used to transfer other forms of energy than those explicitly described herein. For example, metallic or other heat conducting components may be configured to transfer thermal energy in the form of heat into or out from the integrated truss system 100. It should be understood that the present disclosure is not limited to the transfer of any particular form of energy.

In some configurations, at least a portion of the integrated truss system 100 may be used to provide a structural support function in an aircraft. For example, a portion of the integrated truss system 100 may be used as a floor or support structure upon which various aircraft components may be installed. In another example, a portion of the integrated truss system 100 may be used to physically separate one or more compartments of an aircraft. The present disclosure, however, is not limited to any particular configuration of the integrated truss system 100. Generally, the integrated truss system 100 may include any layered component that includes both conductive and non-conductive layers. The conductive layers may be entirely conductive to function as signal transfer paths, or may be partially non-conductive while including one or more signal transfer paths through the non-conductive portions.

Looking at FIG. 1, the integrated truss system 100 may include insulation layers 102A-102C (hereinafter referred to collectively and/or generically as "insulation layers 102") and signal transfer layers 104A and 104B (hereinafter referred to collectively and/or generically as "the signal transfer layers 104"). In some configurations, the insulation layers 102 are configured to, at least partially, electrically separate one of the signal transfer layers 104 from other signal transfer layers 104. In further configurations, the insulation layers 102 are configured to, at least partially, physically separate one or more of the signal transfer layers 104 from other signal transfer layers 104. In this manner, the integrated truss system 100 includes a plurality of insulating levels for electrical isolation and a plurality of transfer levels for transferring signals between components of a vehicle such as an aircraft. It should be understood that the present disclosure is not limited to any particular number or configuration of layers.

The integrated truss system 100 may also include various active and passive components for conditioning signals or other forms of energy that may be transferred through one or more of the signal transfer layers. Some examples, shown by way of illustration, are a diode 103 and a resistor 105. The diode 103 and the resister may be an integral part of the integrated truss system 100 or may be external to the integrated truss system 100. The presently disclosed subject matter is not limited to any particular configuration.

As mentioned above, the signal transfer layers 104 may be configured to provide a power or data transfer path, or both. The signal transfer layer 104A may include a signal input transfer path 106. The signal input transfer path 106 may receive electrical power in the form of a signal from a signal input 108 to be transferred to a destination 110. If the signal input transfer path 106 transfers power, the destination 110 may be various electrical loads in an aircraft including, but not limited to, displays, fans, environmental units, and the like. If the signal input transfer path 106 transfers data, the destination 110 may be a component in a communicative network receiving data from the signal input 108. Although illustrated congruent with the signal transfer layer 104A and the signal transfer layer 104B, the signal input 108A and the destination 110 may be in other signal transfer layers. Further, the signal input 108A may originate from, and the destination may be, outside of the integrated truss system 100. These and other combinations are considered to be within the scope of the present disclosure.

The integrated truss system 100 transfers power received at the signal input 108 to the destination 110 through the use of an interconnect 114. The interconnect 114 transfers power from the signal input transfer path 106 to the signal output transfer path 112, which supplies electrical power to the destination 110. The interconnect 114 has one or more power or electrically conductive locations that, when disposed within the integrated truss system 100, transfer power, or data if the transfer path is a data path, from one level of the integrated truss system 100 to another level of the integrated truss system 100, as explained in more detail in FIG. 2.

Figure 2:
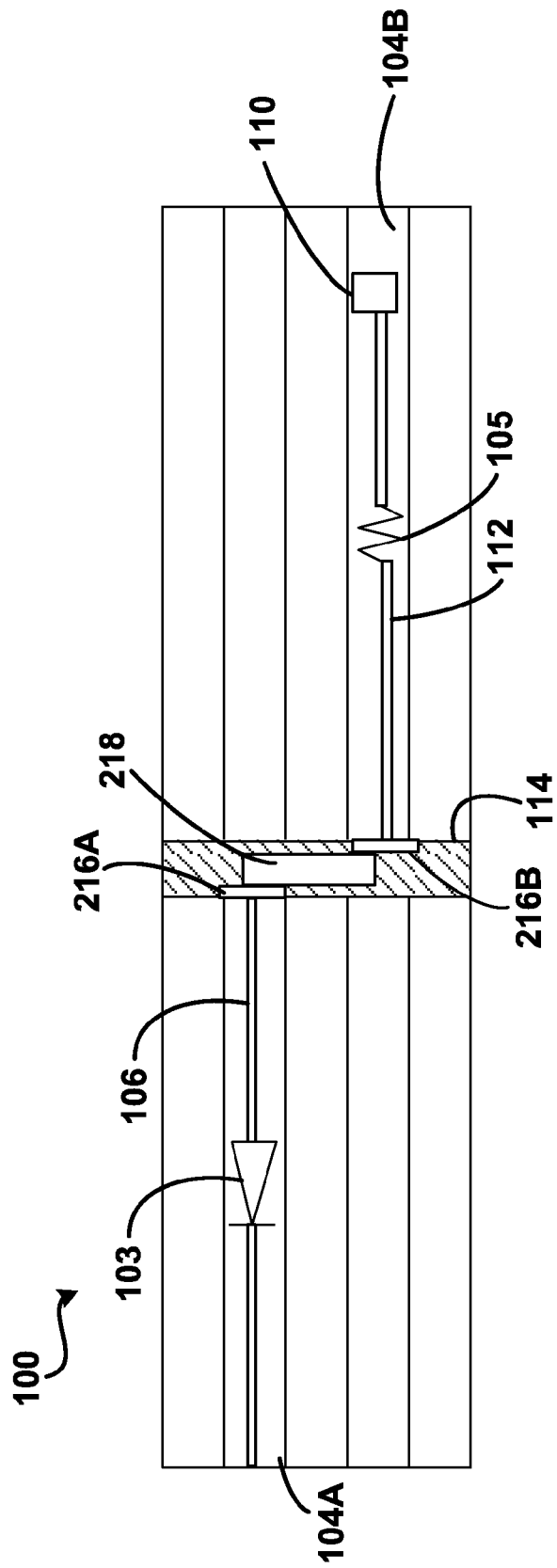
FIG. 2 is a side view of an integrated truss system showing an interconnect, according to various embodiments.

FIG. 2 is a side view of the integrated truss system 100 showing the interconnect 114. The interconnect 114 has signal contacts 216A and 216B. The signal contacts 216A and 216B are configured to receive signals to or output signals from the interconnect 114. To electrically connect the signal contacts 216A and 216B, the interconnect 114 also has an inner conductor 218. The inner conductor 218 electrically connects the signal contact 216A to the signal contact 216B to provide an electrical connection between the signal input transfer path 106 and the signal output transfer path 112. Signals may be transferred to or from the signal input transfer path 106 through the signal contact 216A, through inner conductor 218, through the signal contact 216B and through the signal output transfer path 112 to supply the destination 110. Although described herein as transferring signals, it should be understood that the signal contacts 216A and 216B, as well as other signal contact configurations described herein, may be used to transfer other forms of energy. The use of the term "signal" in describing a signal contact should not be construed as an intent to limit a signal contact to a mechanism limited to the transfer of signals in the form of data or power.

As illustrated in FIG. 2, the interconnect 114 provides electrical continuity between various levels of the integrated truss system 100. Thus, loads in one level of the integrated truss system 100, such as the destination 110, may be supplied power or data, or both, from sources in another level of the integrated truss system 100. Although the present subject matter is not limited to any particular benefit, the ability to transfer data or power between levels in some configurations may provide certain benefits.

For example, placing power or data transfer paths for co-located loads within one level may require a greater footprint than using the three dimensional layout provided by the integrated truss system 100. In another example, the length of the power or data transfer paths may be reduced, thus increasing reliability of the integrated truss system 100. In a further example, the power or data transfer paths may be large, allowing several loads to be supplied from the power or data transfer paths. It should be understood, however, that the presently disclosed subject matter is not limited to any particular benefit. It should also be understood that the presently disclosed subject matter is not limited to an interconnect configured to transfer power or data between different levels, as the interconnect may be configured to transfer power or data in the same level.

Figure 3A:
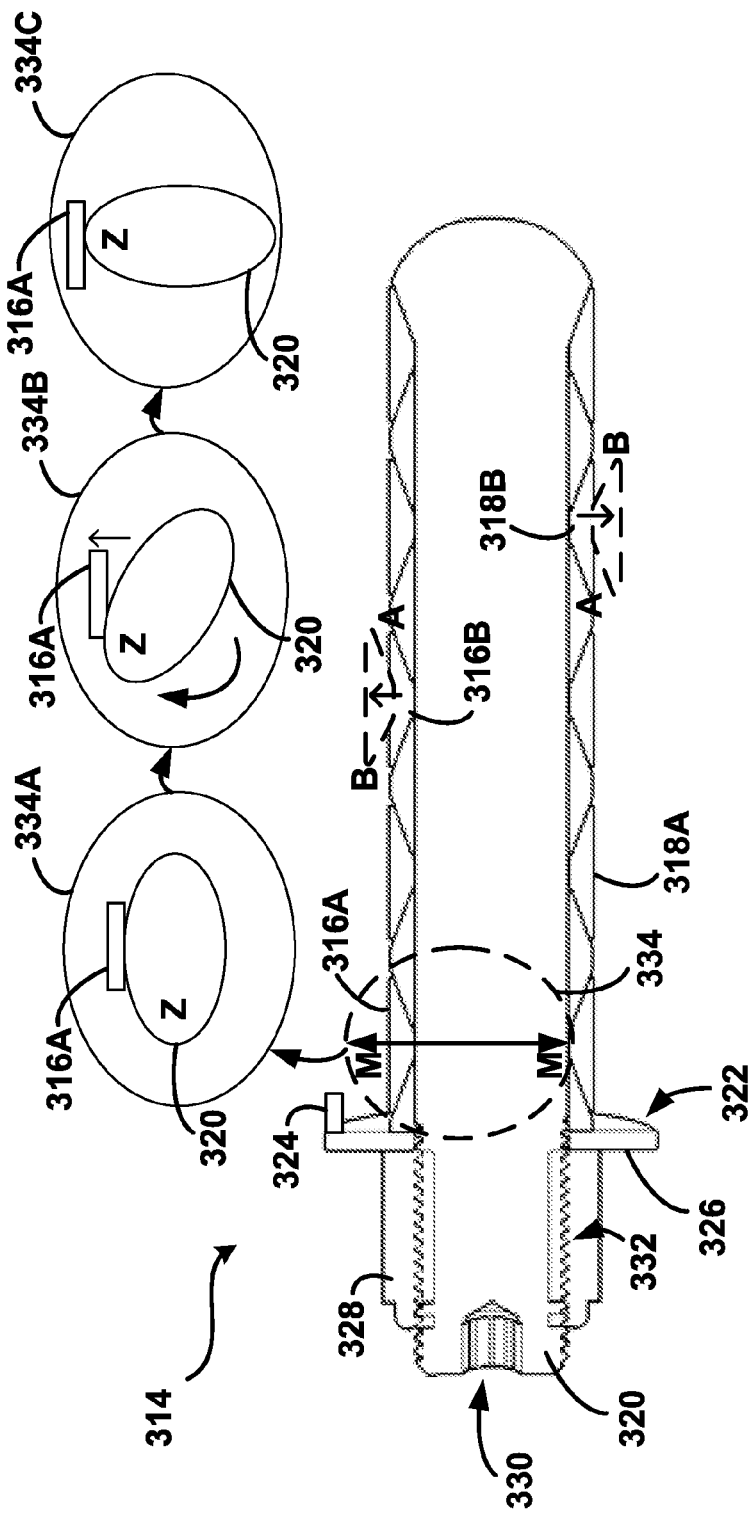

FIG. 3A is a cross-sectional view of an interconnect 314 that may provide both electrical and mechanical connection capabilities. In some uses, including high power applications, interconnects may need to have a strong physical contact strength and also a reliable electrical connection. In some configurations, the interconnect, such as the interconnect 314, may have a dual task. The interconnect may, in some configurations, provide an electrical connection between power or data sources and their respective destinations, as well as, provide mechanical securement for various parts of the integrated truss system 100.

The interconnect 314 may have radially movable signal contacts 316A and 316B and radially moveable non-electrical pads 318A and 318B. As used herein, "radially moveable" means that the signal contacts 316A and 316B and the non-electrical pads 318A and 318B may be extended from a first position to a second position, where the first position is a greater radial distance from a central axis of the interconnect 314 than the second position, and may be retracted from the second position to the first position. Thus, in some configurations, the interconnect 314 may be radially expandable. It should be appreciated that only two signal contacts 316A and 316B and two non-electrical pads 318A and 318B are shown and described with respect to extension and retraction functionality for clarity purposes.

Any number and combination of signal contacts and non-electrical pads may be used to provide the described signal contact and securement capabilities. As used herein, "non-electrical" includes materials that have a high resistance to the flow of electrical, such as non-conductive insulation, or whose primary purpose is to provide a non-electrical function. The signal contacts 316A and 316B and the non-electrical pads 318A and 318B may be configured to extend out from and retract against or into the interconnect 314. This is shown by way of example with regard to the signal contact 316B and the non-electrical pad 318B. The signal contact 316B and the non-electrical pad 318B have a retracted position A and an extended position B. The extended position B is achieved by moving the signal contact 316B and the non-electrical pad 318B from the retracted position A to the extended position B. The extended position B may provide an electrical path from the integrated truss system 100 to the signal contacts 316A and 316B. The extended position B may also provide for the mechanical securement of the interconnect 314 to the integrated truss system 100.

In some configurations, the signal contacts 316A and 316B and the non-electrical pads 318A and 318B are individually extendable or retractable. In other configurations, the signal contacts 316A and 316B and the non-electrical pads 318A and 318B are extendable or retractable in a group. In still further configurations, the signal contacts 316A and 316B may be separately extendable or retractable from the non-electrical pads 318A and 318B. These and other configurations are considered to be within the scope of the present disclosure.

The extension of the signal contacts 316A and 316B and the non-electrical pads 318A and 318B may provide various benefits, including those described above. For example, extended pads may impart a force upon an electrical or mechanical pad of one or more layers of the integrated truss system 100. The impartation of force may increase the electrical conductivity of the integrated truss system 100 by forcing electrically conductive components together. The impartation of force may also increase the rigidity of the integrated truss system 100 by supplying a mechanical force from the interconnect 314 to the integrated truss system 100, thereby creating a removable mechanical securement between the interconnect 314 to the integrated truss system 100. In this manner, the extended position for the signal contacts provides an electrical path from the integrated truss system 100 to the signal contacts 316A and 316B.

Because the interconnect 314 may transfer power or data from one level of the integrated truss system 100 to another level, it may be desirable to have one or more alignment mechanism to vertically align the interconnect 314. For example, alignment lip 326 may provide a means whereby the interconnect 314, when placed in the integrated truss system 100, is vertically aligned so the electrical and non-electrical pads are appropriately positioned to perform their functions. The alignment lip 326 may have a lower surface 322 that sits on an upper surface of the integrated truss system 100. The interconnect 314 may also include alignment tab 324. The alignment tab 324 may be configured to be received in an aperture of the integrated truss system 100. The placement of the alignment tab 324 in an aperture of the integrated truss system 100 may provide a rotational alignment.

To radially move one or more of the pads of the interconnect 314, compression component 320 is provided. The compression component 320 is rotatably disposed within a holder 328. A user may extend or retract one or more of the pads of the interconnect 314 by rotating the compression component 320 using a rotation aperture 330. The rotation aperture 330 may be configured to receive a tool, such as a screwdriver, for rotating the compression component 320. Although not limited to any particular manner in which the compression component 320 may rotate in the holder 328, in one implementation, the interconnect 314 may have a thread system 332 that helps to stabilize the various components of the interconnect 314.

One way in which the extension and retraction of the pads of the interconnect can be controlled is by using an oblong cross-sectional shape for the compression component 320. The oblong cross-sectional shape can provide a mechanical means that transfers a rotational force applied to the compression component 320 to a lateral force applied to the signal contacts 316A and 316B or the non-electrical pads 318A and 318B, or combinations thereof. It should be understood, however, that the presently disclosed subject matter is not limited to an oblong-shaped compression component 320, nor is the presently disclosed subject matter limited to a mechanical extension/retraction apparatus. For example, the various components of the interconnect 314 may be extended and retracted using electrical motors and the like. An exemplary configuration using an oblong-shaped compression component 320 is described in more detail in reference to view 334 and its associated cross-sectional views 334A-334C.

Cross-sectional views 334A-334C, taken across line M-M, provide exemplary illustrations showing how the rotation of the compression component 320 forces the signal contact 316A from a retracted position, as shown in exploded view 334A, to an extended position, as shown in exploded view 334C. The exploded view 334A is a top-down view of the interconnect 314 showing the signal contact 316A in a retracted position. The compression component 320 has a generally oblong shape. Location Z on the compression component 320 is provided as a reference point for purposes of describing the rotation of the compression component 320.

In exploded view 334A, the compression component 320 is in a rotational position that provides for a retracted position for the signal contact 316A. As described briefly above, the retracted position may allow for the disconnect, either mechanically or electrically, of the signal contact 316A from a transfer line of a level of the integrated truss system 100. It should be understood, however, that the present disclosure is not limited to the retracted position being a fully disconnected position, as the interconnect 314 may have one or more pads that are connected in either the retracted or extended position.

If a rotational force is applied to the compression component 320, the oblong shape may force the signal contact 316A to move from the retracted position illustrated in the exploded view 334A to the partially extended position illustrated in the exploded view 334B. In the exploded view 334B, the compression component 320 is partially rotated from the position illustrated in the exploded view 334A. The location Z has moved closer towards the signal contact 316A. As the rotation continues, the oblong shape of the compression component 320 continues to force the signal contact 316A outwards, as illustrated in the exploded view 334C.

In the exploded view 334C, the location Z has moved proximate to the signal contact 316A. The oblong shape of the compression component 320 forces the signal contact 316A to the extended position. The length of movement from a retracted position to an extended position may be controlled in various ways. For example, the compression component 320 may only be partially rotated, thus providing for a partially extended position. This may be desirable in situations in which the fully extended position is unnecessary or may impart a damaging force on a component of the integrated truss system 100.

In some configurations, the rotation of the compression component 320 may only move some pads. For example, at locations in which an outward force is undesirable or unnecessary, the compression component 320 may have a circular cross-sectional shape. Because of its consistent radius about its circumference, the circular portion of the compression component 320 may not impart an outward force. In other configurations, the oblong shape of the compression component 320 may vary to provide differing force outputs.

For example, in locations in which a relatively higher degree of outward force is desired, the compression component 320 may have an oblong shape having a relatively high ratio of the semi-major axis, the diameter that runs through the longest part of the oval, to the semi-minor axis, the diameter that runs through the shortest part of the oval. In locations in which a relatively lower degree of outward force is desired, the compression component 320 may have an oblong shape having a relatively low ratio of the semi-major axis to the semi-minor axis. In further configurations, the lobes of the compression component 320 may vary in position to provide varying degrees of outward force along the length of the compression component. This is illustrated by way of example in FIGS. 4A and 4B, discussed in more detail below.

In some implementations, it may be desirable to provide for an interconnect in which the natural state is the retracted position. For example, some interconnect designs may not be configured to impart a retraction force on the signal contacts 316A and 316B or the non-electrical pads 318A and 318B. Without a force "pulling in" the signal contacts 316A and 316B or the non-electrical pads 318A and 318B towards the center of the interconnect, one or more of the signal contacts 316A and 316B or the non-electrical pads 318A and 318B may remain engaged with a portion of the integrated truss system 100.

If the engagement is severe enough, it may be difficult or impossible to remove the interconnect from the integrated truss system 100. Further, in some implementations, the signal contacts 316A and 316B or the non-electrical pads 318A and 318B may bind in a certain position. In some cases, if the binding is significant, the interconnect may need to be forcibly removed or extracted from the integrated truss system 100 in such a manner as may possibly damage the interconnect or the integrated truss. FIGS. 3B-3F are illustrations showing various views of an interconnect subassembly 340 that may, in some configurations, reduce binding or disengagement issues.

Figure 3B:
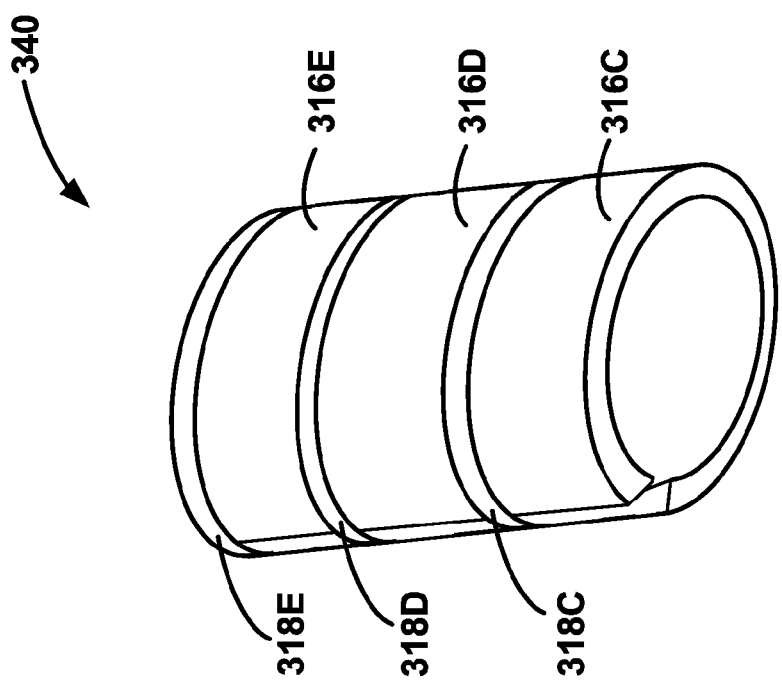

The interconnect subassembly 340 includes signal contacts 316C-316E and non-electrical pads 318C-318E. The signal contacts 316C-316E and the non-electrical pads 318C-318E may be in a stacked arrangement along at least a long of a compression component, whereby the signal contacts 316C-316E are assembled, or stacked, each of the signal contacts 316C-316E separated by at least one of the non-electrical pads 318C-318E. An exemplary stacking arrangement is illustrated in FIG. 3B, forming form the interconnect subassembly 340. The non-electrical pads 318C-318E may act as spacers to separate the signal contacts 316C-316E. The non-electrical pads 318C-318E and the signal contacts 316C-316E are illustrated in more detail in FIGS. 3C and 3D.

Figure 3C:
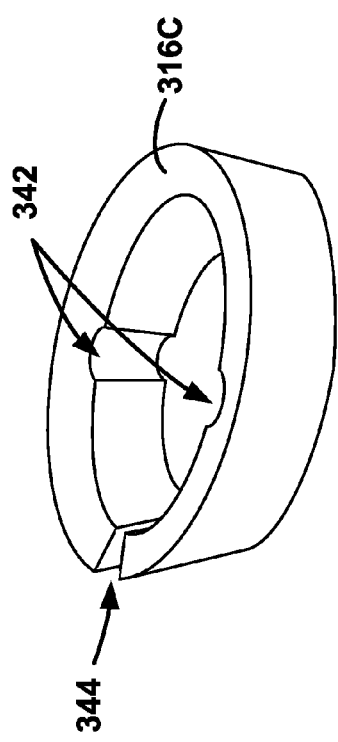

FIG. 3C is a perspective view of the signal contact 316C. The shape of the signal contact 316 may differ depending on the particular design considerations in which the signal contact 316C may be used. The signal contact 316C is shown having a generally oblong or oval shape, but other shapes may be used and are considered to be within the scope of the present disclosure. The signal contact 316C includes recesses 342 that engage with the compression component 320. The recesses 342 may stabilize the compression component 320 in a rotational position that provides for an extended position of the signal contact 316C. The signal contact 316 also includes a contact void 344. The contact void 344 may allow for the expansion and retraction of the signal contact 316C as the compression component 320 is rotated within the interconnect subassembly 340. These and other aspects are illustrated in more detail in FIGS. 3E and 3F, below.

Figure 3D:
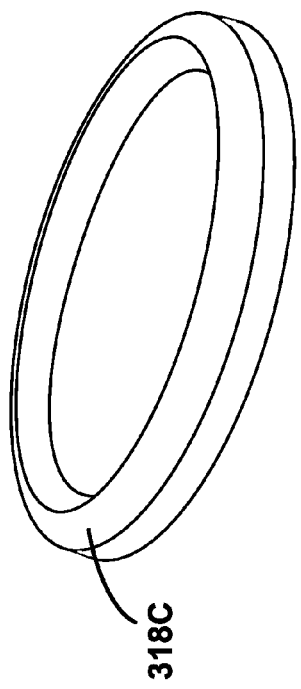

FIG. 3D is a perspective view of the non-electrical pad 318C. The non-electrical pad 318C may provide various functions. For example, the non-electrical pad 318C may separate the signal contacts 316C-316E to prevent or reduce the likelihood that one or more of the signal contacts 316C-316E come in contact with each other. In another configuration, the non-electrical pad 318C may expand and contract, thus providing mechanical securement of the interconnect subassembly 340 within a truss.

FIGS. 3E and 3F are top-down views showing an expanded and retracted position using the interconnect subassembly 340. In FIG. 3E, the compression component 320 is in a first rotational state that provides for a retracted or disengaged position for the signal contact 316C. In this configuration, the compression component 320 is disengaged from the recesses 342. In FIG. 3F, the compression component 320 is in a second rotational state that extends the signal contact 316C outwards. Because the signal contact 316C is extended by the compression component 320, the contact void 344 is relatively larger in size than as shown in FIG. 3E in the refracted position for the signal contact 316C. Further the compression component 320 is engaged with the recesses 342. In some configurations, the engagement of the compression component 320 with the recesses 342 may help secure the compression component 320 in rotational position that extends the signal contact 316C outwards, thus providing for a an electrical path from the integrated truss system 100 to the signal contact 316C.

It should be appreciated that the presently disclosed subject matter is not limited to any particular cross-sectional shape for the compression component 320, or any other component described herein. The compression component 320 may be an oval in the manner described above, other types of ovals, and other shapes, including shapes having irregular features. A compression component may also use technologies other than, or in addition to, its shape to provide various features described herein. For example, a compression component may include magnetic or electro-static technologies to cause the extension and retraction of signal contacts or pads. For example, the portion of the signal contact 316C proximate to the contact void 344 is configured to be magnetized to place the signal contact 316C in an engaged position, providing for an electrical path from the integrated truss system 100 to the signal contact 316C, and demagnetized to place the signal contact 316C in a disengaged position to remove the electrical path from the integrated truss system 100 to the signal contact 316C. The attractive and repulsive force may provide for the extension and retraction of the signal contact 316C. Additionally, it should be understood that the presently disclosed subject matter is not limited to the use of a compression components, such as the compression component 320, that rotate. For example, a compression component may be implemented using magnetic or electrostatic means to cause the extension and retraction of one or more pads rather than the illustrative and exemplary rotational techniques described herein.

FIG. 4A is a top down view of a compression component 320 and FIG. 4B is a side view of the compression component 320. Shown in FIG. 4A are lobe sections 436A-436C. The lobe sections 436A-436C are disposed at various locations along the length of the compression component 320, illustrated by way of example in FIG. 4B. The lobe sections 436A-436C are shown having different rotational positions around the compression component 320. For example, the lobe section 436A is shown having a position in line with the X axis of the compression component 320. The lobe section 436B is shown having a position in line with the Y axis of the compression component 320. And, the lobe section 436C is shown having a position between the X axis and the Y axis of the compression component 320.

As the compression component 320 is rotated in either a clockwise or counterclockwise direction, the lobe sections 436A-436C will rotate. Because the lobe sections 436A-436C are at different orientations along the axis of the compression component 320, the lobe sections 436A-436C will be at different rotational positions with respect to each other. In that manner, the pads along the length of the interconnect 314 will experience different extension and retraction forces. Thus, in the configuration illustrated in FIGS. 4A and 4B, the pads of the interconnect 314 will extend and retract at different points in the rotation of the compression component 320, thus allowing alternating making and breaking of physical and electrical contacts.

The configuration illustrated in FIGS. 4A and 4B may also provide an additional benefit. The alternating making and breaking of contacts may be configured to cause the creation of and removal of circuits in the integrated truss system 100. For example, at one rotational position, the lobe sections 436A-436C may be configured to extend or retract pads that create a certain circuit. In another rotational position, the lobe sections 436A-436C may be configured to extend or retract pads that create a different circuit. This may be beneficial in various configurations. In one configuration, a first rotational position, or orientation, orientation may be the in-user or operational position, a second rotational position, or orientation, may be an open or disconnected state, and a third rotational position, or orientation, may be a testing position where the interconnect is in a test state. In some implementations, the test state may provide for diagnostic testing of an interconnect, such as the interconnect 314. In another configuration, the first rotational position may be a first circuit configuration designed to perform a first task and the second rotational position may be a second circuit configuration designed to perform a second task.

Depending on the particular configuration of the integrated truss system 100, as well as the size of an interconnect, it may be necessary or desirable to minimize the possibility of non-power or data transfer portions of an interconnect to make contact with various portions of the integrated truss system 100. For example, the aperture in which an interconnect is inserted may be small enough to cause various elements of the interconnect not designed or intended to make electrical or physical contact with the integrated truss system 100 to do so, described in more detail in FIG. 5.

Figure 5:
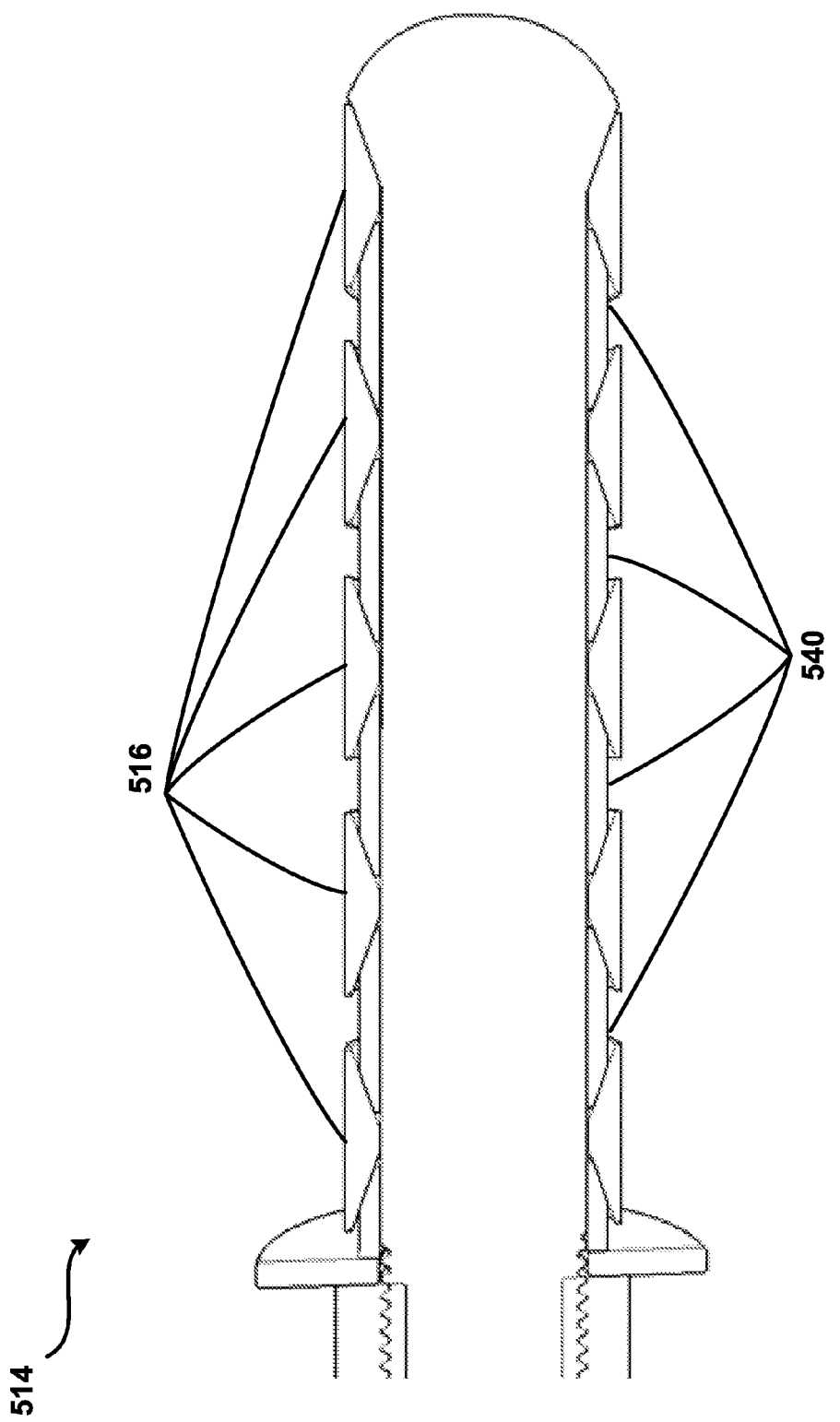
FIG. 5 is a side, cross-sectional view of an interconnect having a contact-reduction configuration, according to various embodiments.

FIG. 5 is a side, cross-sectional view of an interconnect 514 having a contact-reduction configuration. The interconnect 514 includes signal contacts 516. The signal contacts 516 may be in electrical communication with each other in various ways to form transfer paths between levels. As mentioned briefly above, when inserting the interconnect 514 into the integrated truss system 100, if the space in which the interconnect 514 is inserted is close in fit to the interconnect 514, various parts of the interconnect 514 not intended for contact with the integrated truss system 100 may come in contact with the integrated truss system 100.

For example, the interconnect 514 may include a conductor 540 that helps facilitate the transfer of data or power between one or more of the signal contacts 516. If the conductor 540 was to come in contact with a portion of the integrated truss system 100, the contact may create a short, reducing the integrity of the integrated truss system 100 while increasing the possibility of component failure or fire. Thus, it may be beneficial to reduce the probability of inadvertent and undesirable electrical contact between the conductor 540 and the integrated truss system 100.

To reduce the likelihood of inadvertent contact, the conductor 540 is a greater distance from the center of the interconnect 514 than the signal contacts 516. As illustrated, the outer surface of the conductor 540 does not extend to the same distance as the outer surface of the signal contacts 516. In this configuration, when placed in the integrated truss system 100, the conductor 540 of the interconnect 514 may have a reduced probability of coming in contact with a portion of the integrated truss system 100.

Figure 6:
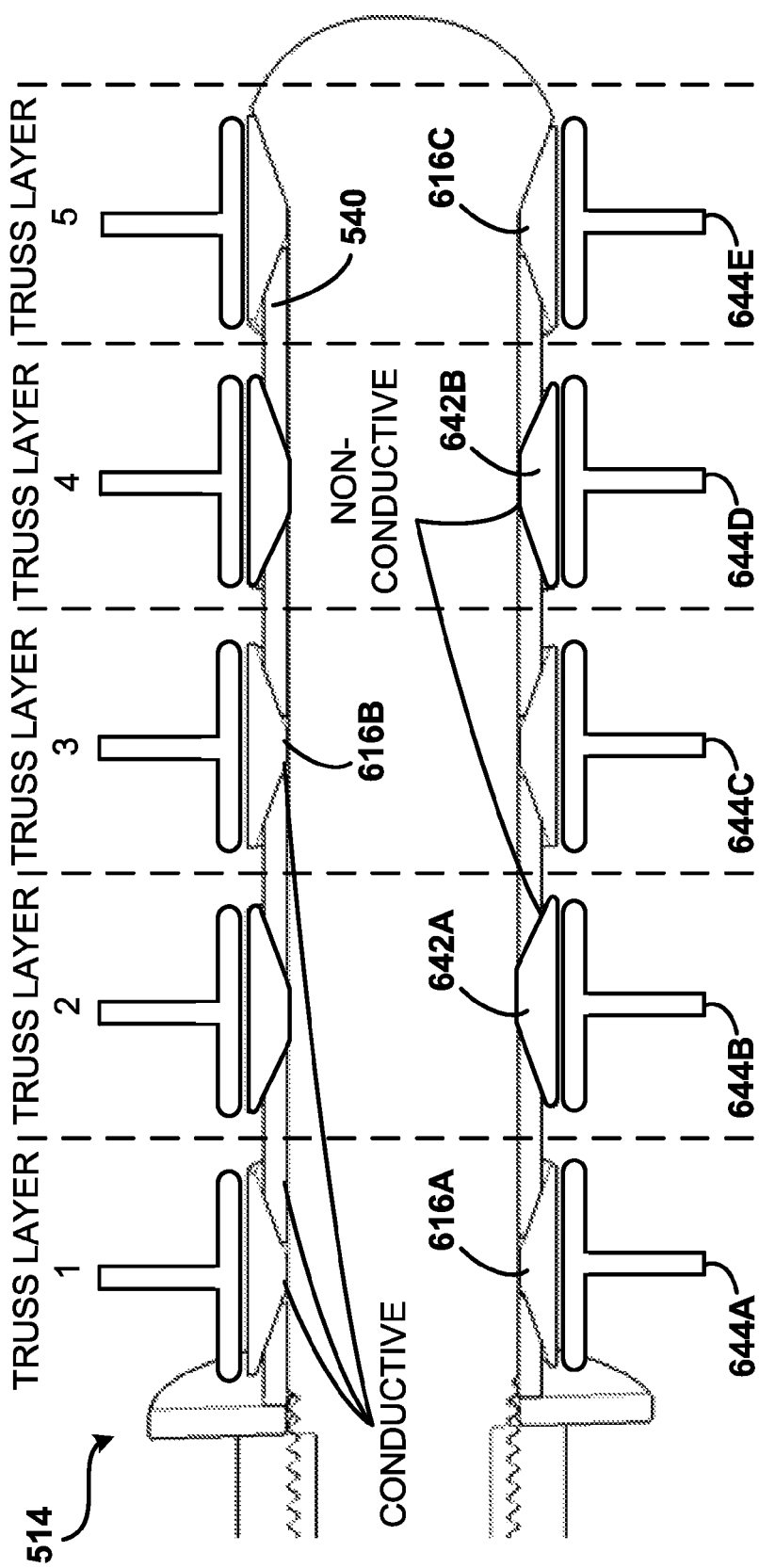
FIG. 6 is a side, cross-sectional view of an interconnect with conductive and non-electrical pads, according to various embodiments.

As mention above, an interconnect may have conductive and non-electrical pads to provide various benefits. FIG. 6 is a side, cross-sectional view of the interconnect 514 with conductive and non-electrical pads for use in the integrated truss system 100. In FIG. 6, the integrated truss system 100 is shown having truss layers 1-5. As described above, the layers of an integrated truss system 100 may represent a functional layer. For example, the truss layer 1 may be a data layer for aircraft environmental systems. The truss layer 3 may be a power transfer layer through which electrical power is transferred. The truss layer 5 may be ground layer that provides a ground path for various electrical systems in the aircraft. In this manner, a conductor may be used to facilitate a transfer of power between a first level of the interconnect to a second level of the interconnect. These and other types of electrical circuits, including data and power, are considered to be within the scope of the presently disclosed subject matter.

The interconnect 514 also has signal contacts 616A-616C (hereinafter referred to collectively and/or generically as "signal contacts 616") that are configured to conduct electricity. In the presently disclosed subject matter, electricity may include both data and power as well as any other form or use of electric-magnetic energy. For example, the signal contacts 616 may be configured to transfer light signals used in a fiber-optic network. One or more of the signal contacts 616 may be in electrical communication with other signal contacts 616 in addition to various electrical systems in an aircraft. Power and/or data may be transferred through the conductor 540.

The interconnect 514 also has non-electrical pads 642A and 642B (hereinafter referred to collectively and/or generically as "non-electrical pads 642"). The non-electrical pads 642 may be configured to provide mechanical support when in contact with one or more of the truss layers of the integrated truss system 100. For example, the non-electrical pads 642, when in an extended position, may help secure the interconnect 514 within the integrated truss system 100. This securement may help reduce the possibility of inadvertent removal caused by the movement of the aircraft while in use, especially in high vibrational environments such as when an airplane is experiencing turbulent flight conditions. These and other uses are considered to be within the scope of the present disclosure.

In use, the interconnect 514 may be manipulated so that the signal contacts 616 and the non-electrical pads 642 are in an extended position. In the extended position, the signal contacts 616 and the non-electrical pads 642 may come in contact with truss contacts 644A-644E (hereinafter referred to collectively and/or generically as the "truss contacts 644"). The truss contacts 644 may be configured to provide a functional contact point to receive the signal contacts 616 and the non-electrical pads 642. For example, the truss contact 644A may be metal or another form of conductive material to receive power or data from, or transmit power or data to, the signal contact 616B. In another configuration, the truss contact 644B may be configured to provide structural or mechanical support to the non-electrical pad 642A. For example, the truss contact 644B may be a reinforced pad configured to receive a high degree of force from the non-electrical pad 642A to secure the interconnect 514 in the integrated truss system 100.

Figure 7:
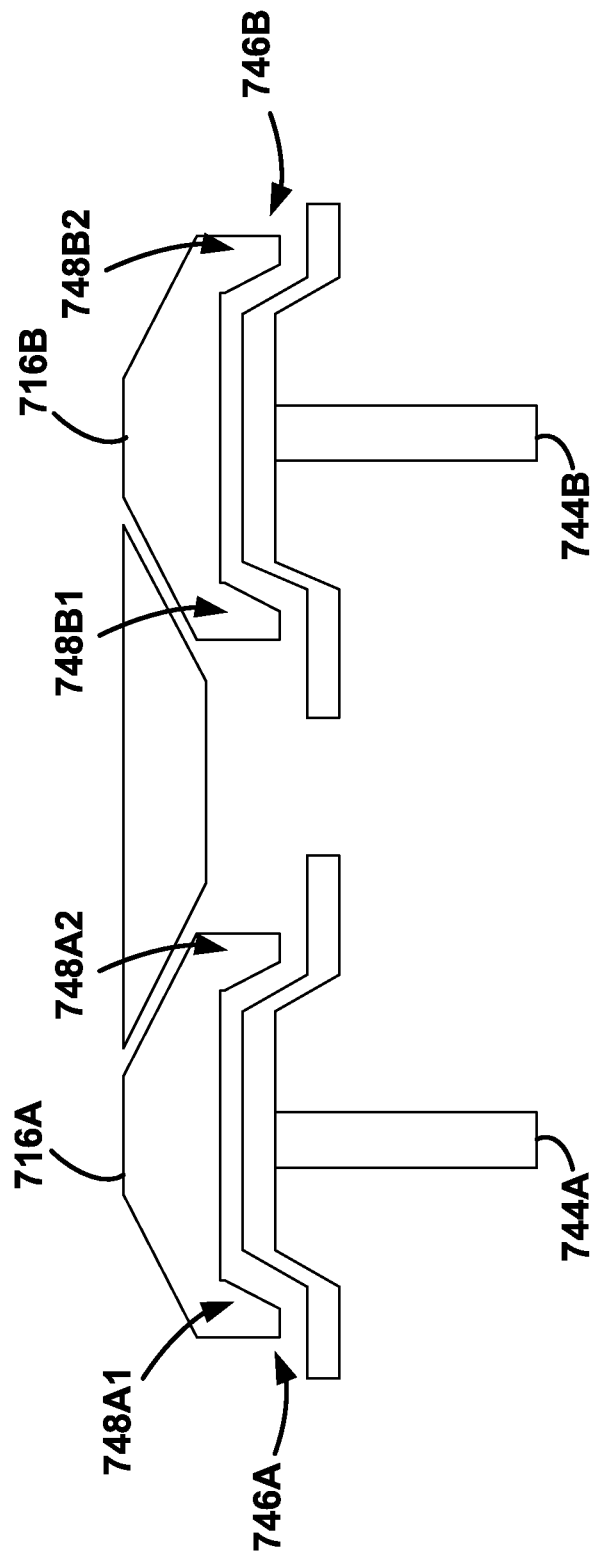
FIG. 7 is a side, cross-sectional view of a portion of an interconnect that is configured to provide an increased mechanical securement, according to various embodiments.

FIG. 7 is a side, cross-sectional view of a portion of an interconnect that is configured to provide an increased mechanical connection. In the configuration illustrated in FIG. 6, the mating surface between the signal contacts 616 or the non-electrical pads 642 and the truss contacts 644 is illustrated as being relatively planar or flat. While in some configurations the relatively flat mating surface may be sufficient to transfer electricity or mechanically connect the various components, in some instances, the relatively flat surface may not be sufficient. For example, in high turbulence conditions, lateral movement of the aircraft may cause the mating surfaces to move in different directions relative to one another. In addition to possibly causing an open circuit if the movement is severe enough, over time, the movement may cause the mating surfaces to wear down. The wearing down of the mating surfaces may cause a loss of material, possibly leading to opens in the transfer path.

In FIG. 7, signal contacts 716A and 716B (hereinafter referred to collectively and/or generically as the "signal contacts 716") have a shaped surface to provide a mechanical alignment means. The shaped surface may reduce the lateral movement of a portion of signal contacts against a portion of the truss contacts. For example, the signal contact 716A includes pad teeth 748A1 and 748A2 and the signal contact 716B includes pad teeth 748B1 and 748B2. The pad teeth 748A1, 748A2, 748B1, and 748B2 (hereinafter referred to collectively and/or generically as the "pad teeth 748") have a shape designed to create a mating pair 746A and 746B between the signal contacts 716 and truss contacts 744A and 744B, respectively (hereinafter referred to collectively and/or generically as the "truss contacts 744"). A portion of the truss contacts 744 are shaped with complimentary teeth designed to receive and engage the shaped surface formed by the pad teeth 748. It should be noted that the shapes illustrated herein are not drawn to scale and may be changed depending on design considerations of a particular implementation. The shapes illustrated herein and other appropriate shapes are considered to be within the scope of the present disclosure.

In some configurations, the complementary shapes of the pad teeth 748 and the truss contacts 744 may provide various benefits, including those described above. For example, the pad teeth 748 may help reduce lateral movement of the signal contacts 716 in relation to the truss contacts 744. Further, the pad teeth 748 may provide an alignment mechanism. In some configurations, in addition to or in lieu of the mechanical benefits, the mating pair 746A and 746B illustrated in FIG. 7 may also provide electrical benefits. For example, the shapes of the mating pair 746A and 746B between the pad teeth 748 and the truss contacts 744 may increase the contact surface area between the two. The increased contact surface area may allow for better conductivity between the pad teeth 748 and the truss contacts 744.

Figure 8:
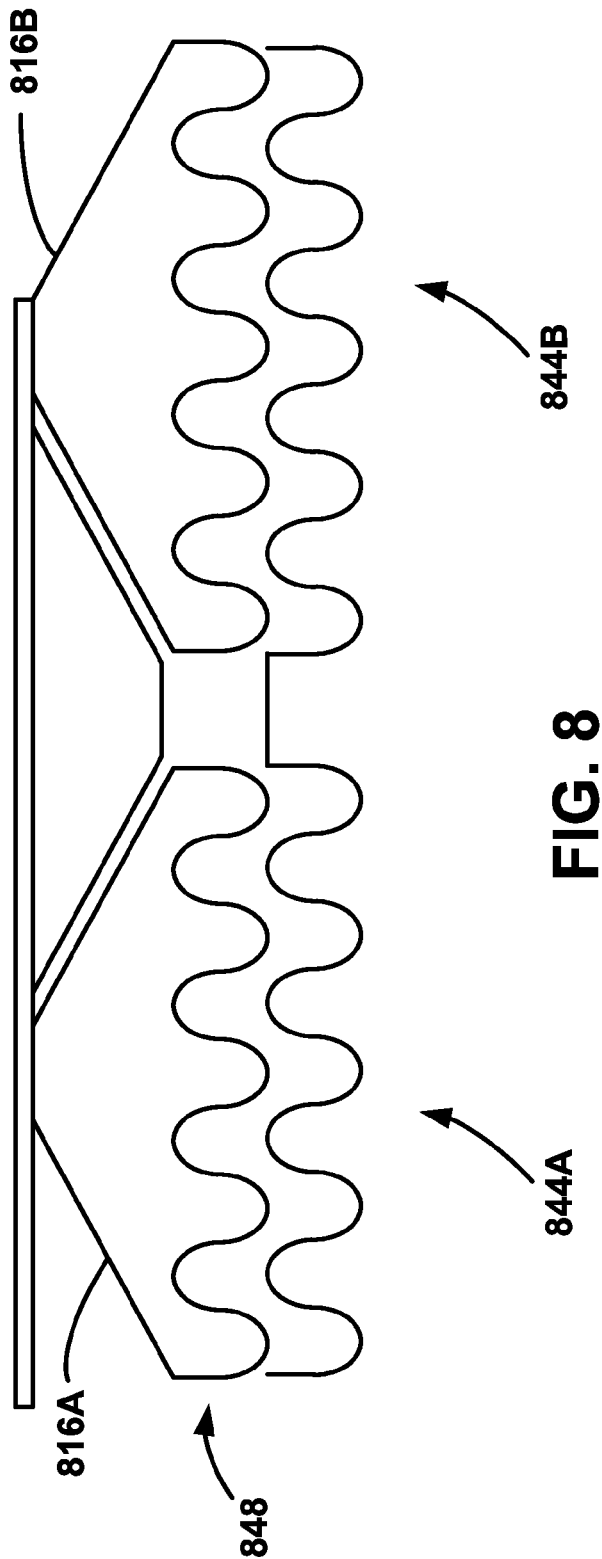
FIG. 8 is a side, cross-sectional view of an alternate interconnect that is configured to provide an increased mechanical securement, according to various embodiments.

FIG. 8 is a side, cross-sectional view of an alternate interconnect that is configured to provide an increased mechanical connection. In FIG. 8, signal contacts 816A and 816B have an increased number of pad teeth 848 on truss contacts 844A and 844B when viewed in relation to the pad teeth 748 of FIG. 7. The increased number of pad teeth can provide an increased mechanical alignment as well as provide an increased surface area in which an electrical connection may be formed.

An interconnect for use in various configurations described herein is not limited to tubular-shaped interconnects, such as those illustrated by way of example in FIGS. 2-8. FIGS. 9A-9C to FIG. 11 are illustrations of alternate implementations of an interconnect for use in the integrated truss system 100.

FIG. 9A is a side view of truss sleeves 950A and 950B that may be used to form an interconnect. The truss sleeve 950A has conductive patches 952A and 952B, while the truss sleeve 950B has conductive patch 952C. The conductive patches 952A-952C may be metal or other conductive material disposed on or formed as an integral part of the truss sleeves 950A and 950B. Preferably, conductive patches 952A-952C are composed of conductive or semi-conductive materials, such as, but not limited to, copper, aluminum, gold, silver and nickel, including allows thereof. Further, the conductive materials may include composites or compositions of conductive and non-conductive materials such as metal-impregnated polymers and wood pulp-based products.

Returning to FIG. 9, a metal layer forming one of the conductive patches 952A-952C may be deposited on a surface of the truss sleeves 950A or 950B. In another example, the conductive patches 952A-952C may be disposed within the truss sleeves 950A or 950B. These and other manufacturing techniques are considered to be within the scope of the present disclosure. The conductive patches 952A-952C may act as the signal contacts when in contact with a suitable portion of an integrated truss system. The non-conductive portions of the truss sleeves 950A and 950B may preferably be composed of flexible or semi-flexible, non-conductive material. Some examples include, but are not limited to, polymers, including various forms of rubber, plastics, paper, and other suitable resistive materials. The non-conductive portions of the truss sleeves 950A and 950B may act as non-electrical pads when in contact with an integrated truss system.

Figure 9C:
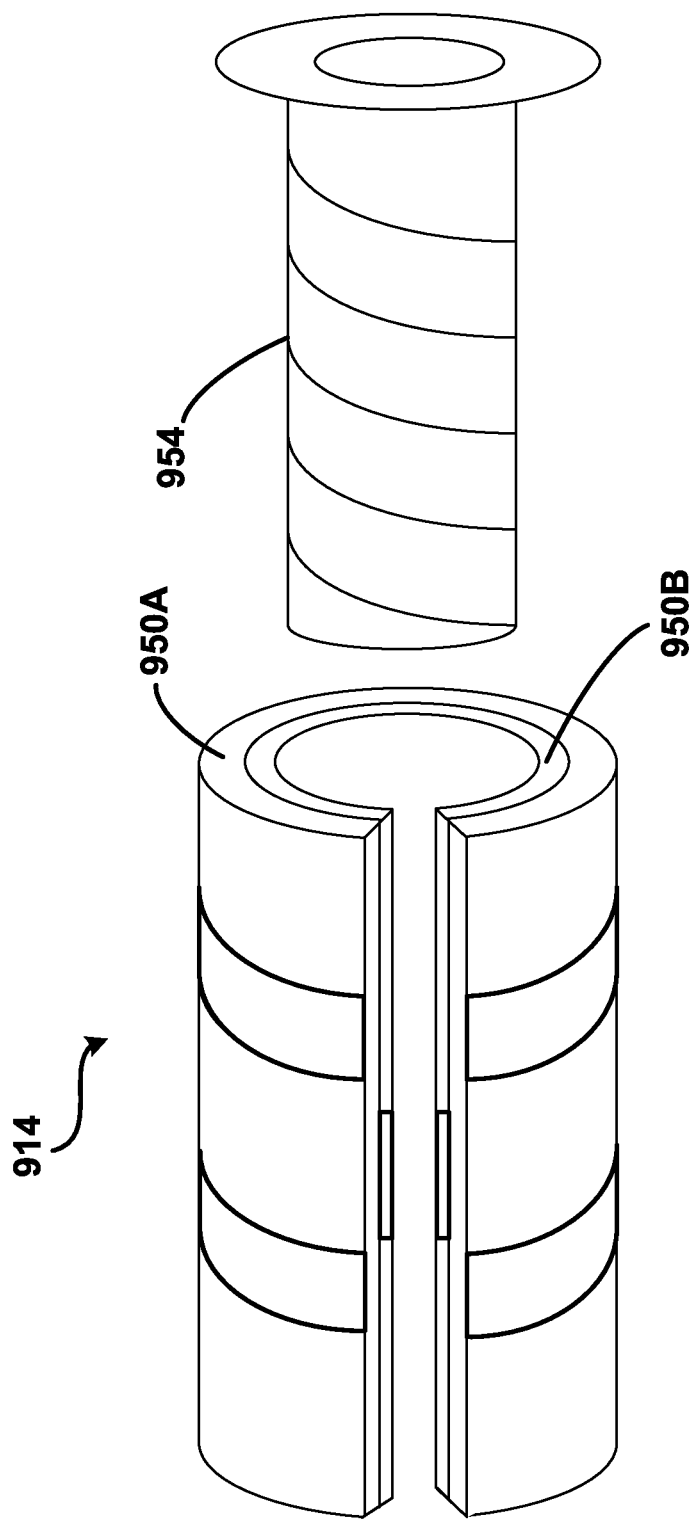
FIG. 9C is a side view of an interconnect formed from truss sleeves, according to various embodiments.

To form an interconnect, the truss sleeves 950A and 950B are abutted to each other, as shown in FIG. 9B. In some implementations, an insulation layer (not shown) may be placed between the truss sleeves 950A and 950B. The insulation layer may help reduce the probability of electrical contact between the conductive patches 952A-952C. The truss sleeves 950A and 950B are thereafter folded to encircle a central axis to create an interconnect 914, as shown in FIG. 9C.

To increase the diameter of the interconnect 914, providing for an outward force to secure the interconnect 914 in the integrated truss system 100, an expander 954 may be used. In FIG. 9C, the expander 954 is a compression bolt, however, the presently disclosed subject matter is not limited to any type of expander. The expander 954 may be configured to provide an outward force on the truss sleeves 950A and 950B to secure the truss sleeves 950A and 950B in an integrated truss system. The expander 954 may be sized so that when inserted into the interconnect 914, the interconnect 914 is expanded outward. The expander 954 may be removed to facilitate the removal of the interconnect 914.

Figure 10:
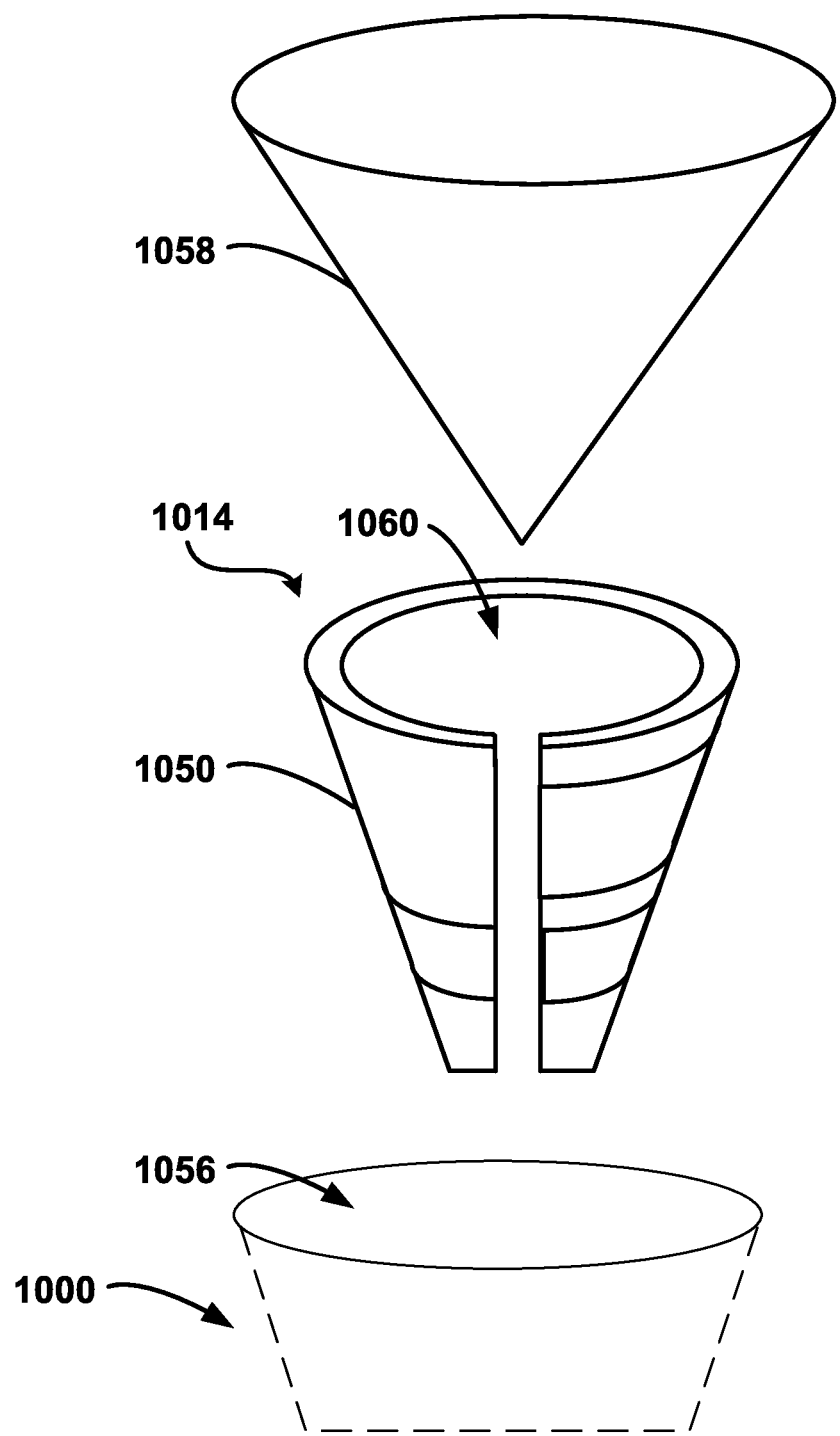
FIG. 10 is a side view of an alternate interconnect formed from a sleeve, according to various embodiments.

FIG. 10 is a side view of an alternate interconnect formed from a sleeve. In FIG. 10, an interconnect 1014 has been formed from a truss sleeve 1050. Instead of the generally cylindrical shape illustrated in FIG. 9C, the interconnect 1014 of FIG. 10 has been formed in a conical shape. To insert and secure the interconnect 1014 in an aperture 1056 of an integrated truss system 1000, an expander such as an interconnect installation device 1058 is provided. The interconnect installation device 1058 may be configured to be struck or receive a force from an object (such as a hammer). When placed in an aperture 1060 of the interconnect 1014, the striking force onto the interconnect installation device 1058 may force the interconnect 1014 into the aperture 1056 of the integrated truss system 1000. Repeated striking may secure the interconnect 1014 in the integrated truss system 1000.

Figure 11:
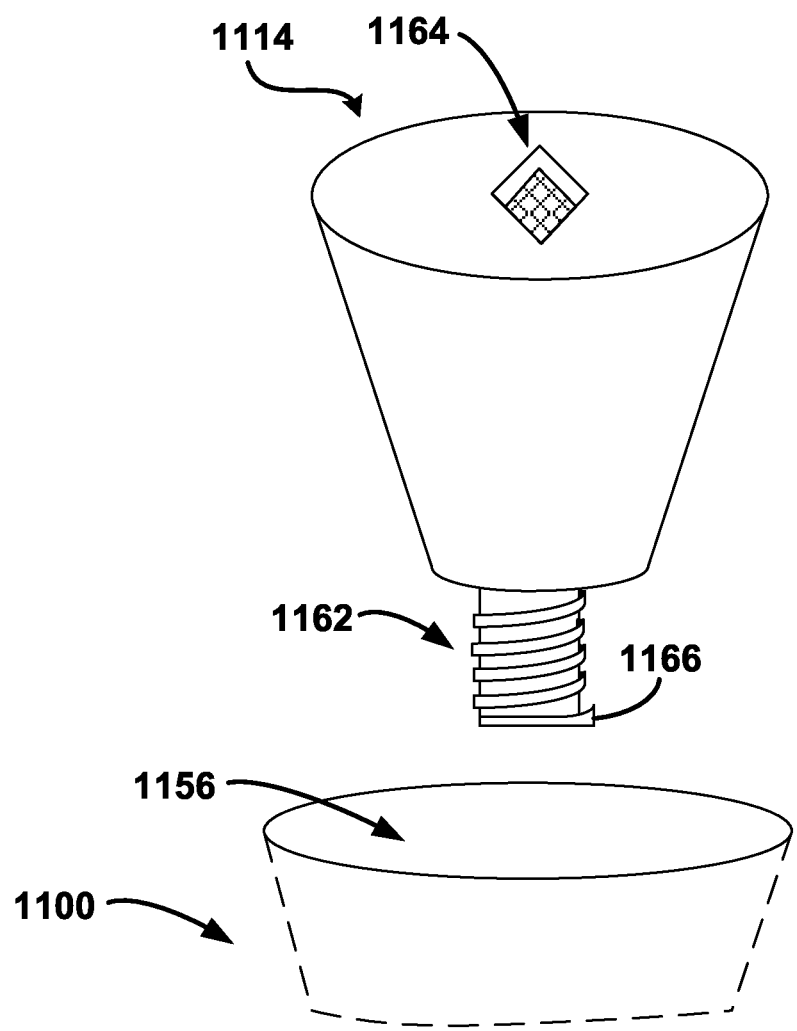
FIG. 11 is side view of an interconnect configured for rotational securement into an aperture of an integrated truss system, according to various embodiments.

An interconnect may be secured within an integrated truss system in still further ways. FIG. 11 is side view of an interconnect 1114 configured for rotational securement into an aperture 1156 of an integrated truss system 1100. The interconnect 1114 may include threads 1162. The threads 1162 may be received in an complementary feature in the integrated truss system 1100. When rotated using a tool (not shown) inserted into the keyhole 1164, the threads 1162 act to secure the interconnect 1114 into the integrated truss system 1100. The keyhole 1164 can be shaped to receive only a certain shape of tool. In some implementations, this may help secure the interconnect 1114 by using a shape that is only known to a certain selected group. In some configurations, to reduce the probability of inadvertent or unwanted removal, a lock 1166 may be used in conjunction with the threads 1162. The lock 1166 may be used in complementary feature of the integrated truss system 1100 so that when engaged, the extraction of the interconnect 1114 from the integrated truss system 1100 may require additional force or other manipulative action. In some implementations, the lock may be configured to further secure the interconnect 1114 in an integrated truss system.

When securing the interconnect 1114, or other configurations of interconnects described herein, in the integrated truss system 1100, it may be necessary or desirable to limit the amount of torque applied to the interconnect 1114 to prevent the over-tightening (or over-torque) of the interconnect 1114.

Figure 12:
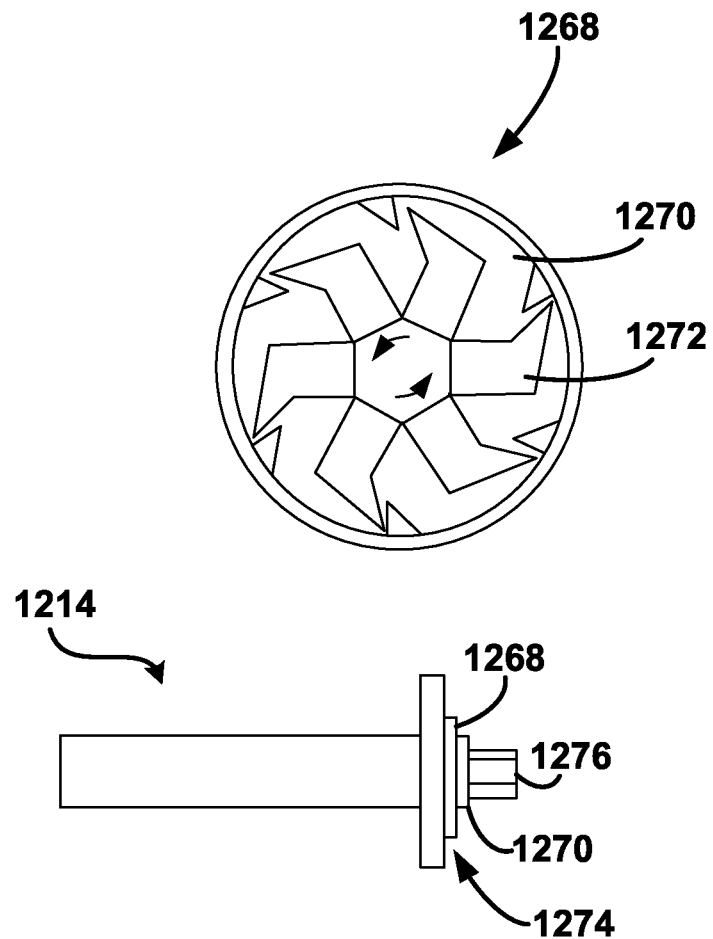
FIG. 12 is an illustration of a torque limiter that may be used to reduce the likelihood of over-torqueing an interconnect, according to various embodiments.

FIG. 12 is an illustration of a torque limiter 1268 that may be used to limit over-torqueing interconnect 1214, thereby reducing the likelihood of over-torqueing an interconnect. The torque limiter 1268 may include a torque limiter base 1270 and a torque limiter nut 1272. The torque limiter base 1270 may be installed on a bolt base 1274 configured to receive an interconnect bolt 1276 of an interconnect 1214. The torque limiter base 1270 may be fixedly attached to the bolt base 1274 to prevent or limit the rotation of the torque limiter base 1270 when the interconnect bolt 1276 is rotated.

The torque limiter nut 1272 may be secured around the interconnect bolt 1276. In some implementations, the position of the torque limiter nut 1272 on the interconnect bolt 1276 is configured so that at a certain torque, the torque limiter nut 1272 engages with the torque limiter base 1270. The engagement may reduce or limit the ability to continue rotation of the interconnect bolt 1276 beyond that rotational point. Other methods of preventing or reducing the likelihood of over-torqueing of the interconnect bolt 1276 are considered to be within the scope of the present disclosure.

Figures 13A, 13B:
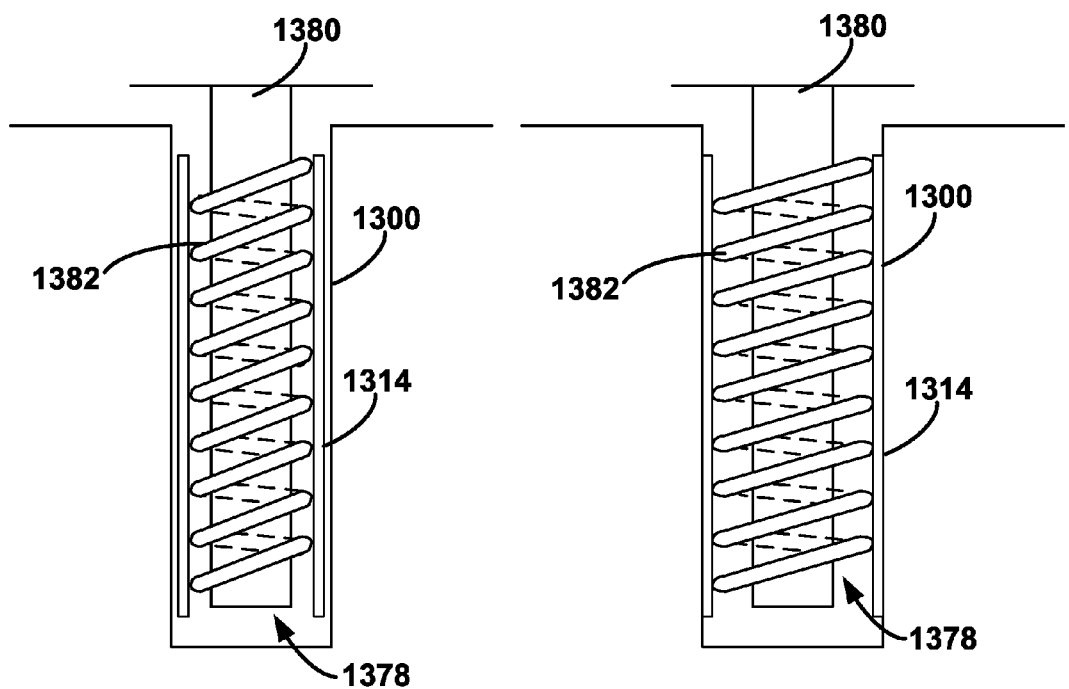
FIGS. 13A and 13B are side views illustrating a spring mechanism for applying a compressive force, according to various embodiments.

FIGS. 13A and 13B are side views of a spring mechanism for applying a compressive force. As described above in regard to FIG. 9C, the expander 954 may be sized so that when inserted into the interconnect 914, the interconnect 914 is expanded outward. In FIG. 10, the interconnect installation device 1058 provides the compressive force when struck.

In FIG. 13A, an expander in the form of a spring mechanism 1378 is used to force an interconnect 1314 against the sidewalls of an integrated truss system 1300. The spring mechanism 1378 may include a central pole 1380 that provides support to a spring 1382. The central pole 1380 may also translate a rotational force into an expansion of the spring 1382. This is illustrated further in FIG. 13B.

In FIG. 13B, the central pole 1380 has been rotated a certain amount. The rotation has caused the spring 1382 to move outward from the central pole 1380. The outward movement of the spring 1382 forces the interconnect 1314 against the sidewalls of the integrated truss system 1300, thus securing the interconnect 1314 in the integrated truss system 1300.

Figure 14A:
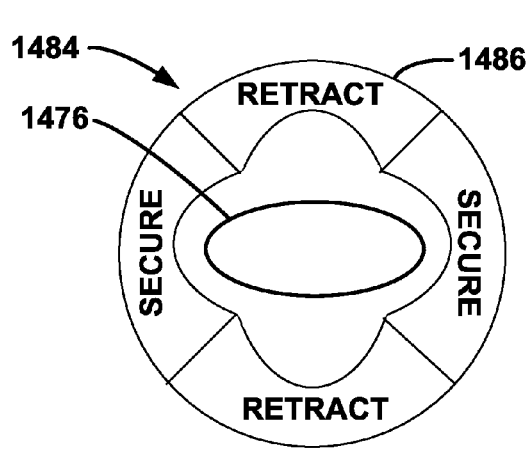
FIGS. 14A-14C are top down views of an interconnect indicator, according to various embodiments.
Figure 14B:
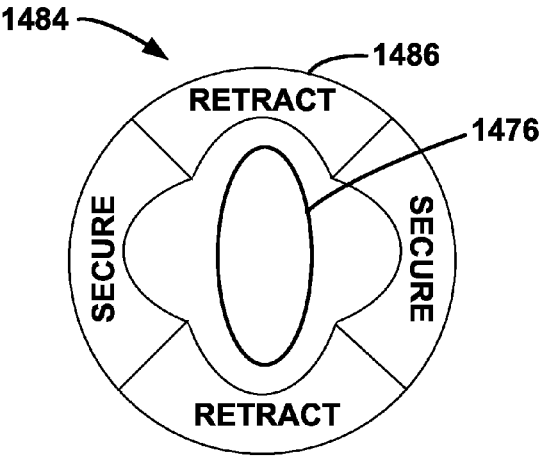
Figure 14C:
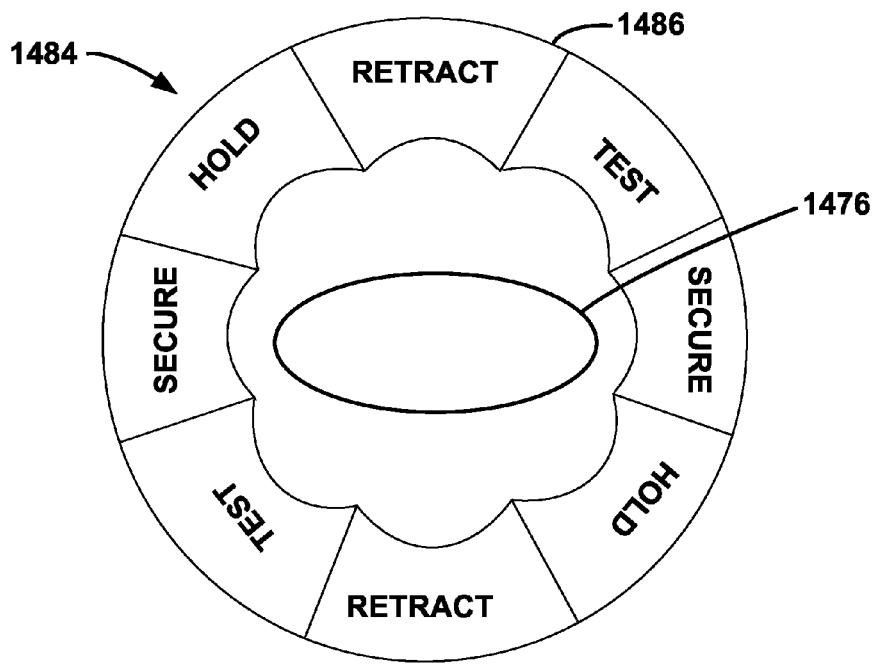

When rotating or using various components of an interconnect according to various embodiments described herein, it may be beneficial to have a visual indication of the status of the interconnect. FIGS. 14A-14C provide an exemplary way in which the status of an interconnect may be visually presented.

FIG. 14A is a top down view of an interconnect indicator 1484. The interconnect indicator 1484 may be installed on a bolt base, such as the bolt base 1274 of FIG. 12. Interconnect indicator 1484 may be configured to provide a visual indication of the status of an interconnect. The indication of the status of an interconnect may be based on the alignment of an interconnect bolt 1476 with a positional status base 1486 of the interconnect indicator 1484. The positional status base 1486 may have various positions indicated thereon, such as, but not limited to, SECURE and RETRACT. For example, the SECURE position illustrated in FIG. 14A may indicate that an interconnect is secured in an integrated truss system. The SECURE position may correlate to a first positional state in which one or more signal contacts or non-electrical pads are placed an extended position. In another example, the RETRACT position illustrated in FIG. 14B may indicate that an interconnect is ready to be removed from an integrated truss system. The RETRACT position may correlate to a second positional state, or orientation, in which one or more signal contacts or non-electrical pads are placed a retracted position.

The positional status base 1486 may also have additional positions depending on the configuration of the particular interconnect. FIG. 14C is a top down view of the interconnect indicator 1484 with additional functional or mechanical positions. In addition to the SECURE and RETRACT positions illustrated in FIGS. 14A and 14B, the positional status base 1486 of FIG. 14C has a TEST and HOLD position. In some configurations, when the interconnect bolt 1476 is rotated to the TEST position, the interconnect may be in a configuration that allows diagnostic or repair testing of the interconnect. In further configurations, when the interconnect bolt 1476 is rotated to the HOLD position, the interconnect may be installed in the integrated truss system but not functionally connected to the integrated truss system. This may allow elements of the interconnect, the integrated truss system, or another system, to be held in place prior to activation.

Figure 15:
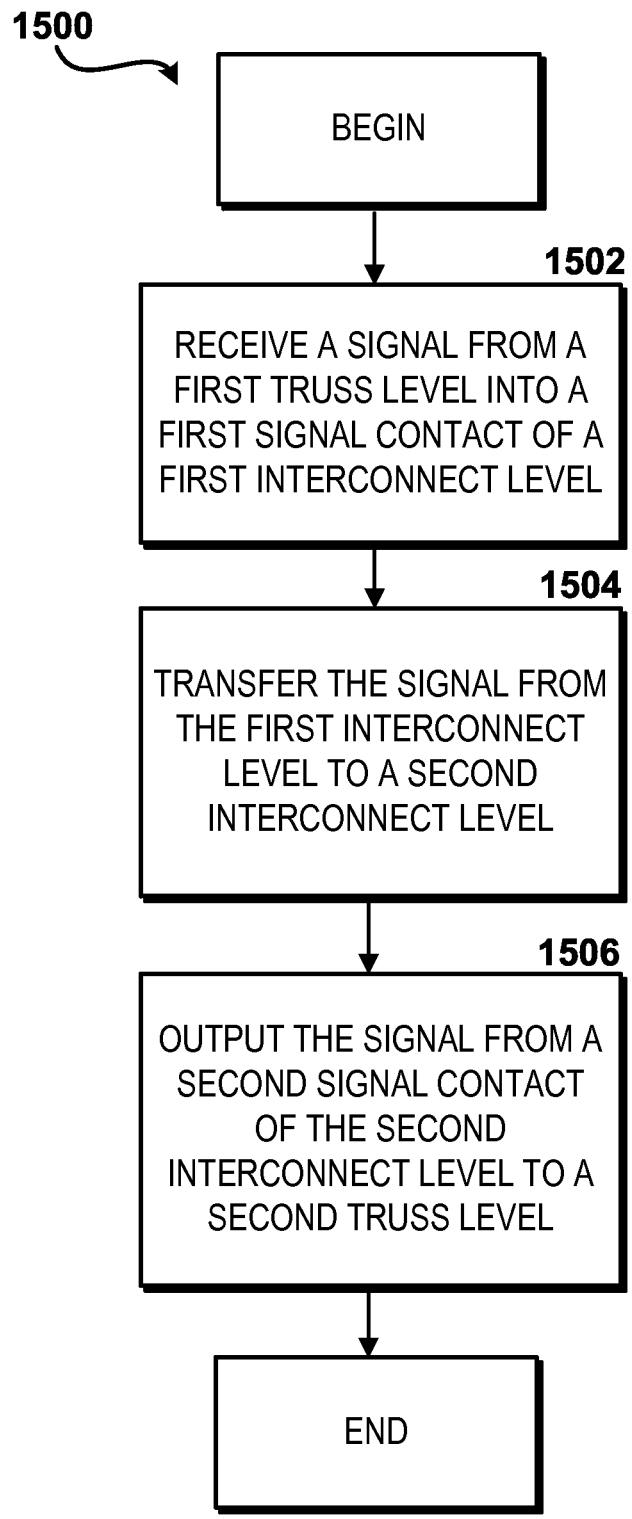
FIG. 15 is an illustrative routine for transferring power or data between levels of an integrated truss system, according to various embodiments.

Turning now to FIG. 15, an illustrative routine 1500 for transferring data signal between levels of an integrated truss system is provided herein. Unless otherwise indicated, it should be appreciated that more or fewer operations may be performed than shown in the figures and described herein. Additionally, unless otherwise indicated, these operations may also be performed in a different order than those described herein.

The routine 1500 starts at operation 1502, where a signal is received at a first truss level of an integrated truss system 100 into a first signal contact of a first interconnect level of the interconnect 114. As discussed above, the presently disclosed subject matter is not limited to any particular manner in which the signal is received at the first truss level. For example, the signal may be received from a source within the truss level or may be received from a source outside of the integrated truss system 100 directly into the first truss level. As described above, the integrated truss system 100 may include several levels, with each providing power or data distribution to various components in an aircraft. The power may be received from various sources including, but not limited to, onboard electrical generators. The data may be from a central computer intended for an aircraft component or may be data sent between components. The power or data may be received using various structures including, but not limited to, signal input transfer path 106. The components used to conduct electricity may be formed from any suitable material for conducting electricity.

The routine 1500 proceeds to operation 1504, where the signal is transferred from the first interconnect level to a second interconnect level. As described above in various configurations, the signal may be transferred through various mechanisms in the interconnect. For example, the conductor 540 may be used. In other configurations, internal wiring (not illustrated) may be used between various signal contacts 516 to connect one or more of the signal contacts 516 to other signal contacts 516.

The routine 1500 proceeds to operation 1506, where the signal from the second interconnect level is outputted from a second signal contact of the second interconnect level to a second truss level of the integrated truss system. As mentioned above, the present disclosure is not limited to configurations in which power or data is transferred to different levels, as various configurations of the interconnect may provide for intra-level power or data transfer. The routine thereafter ends.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. An interconnect for use in an integrated truss system, the interconnect comprising:
   a compression component having a length, a first orientation and a second orientation;
   a plurality of signal contacts having a first positional state and a second positional state, the plurality of signal contacts being disposed adjacent to a portion of an outer surface of the interconnect and along at least a portion of the length; and
   a plurality of non-electrical pads having the first positional state and the second positional state, the plurality of non-electrical pads being interspersed between at least a portion of the plurality of signal contacts for mechanical securement,
   wherein when the compression component is in the first orientation, at least a portion of the plurality of signal contacts and at least a portion of the plurality of non-electrical pads are in the first positional state, and
   wherein when the compression component is in the second orientation, the at least a portion of the plurality of signal contacts and the at least a portion of the plurality of non-electrical pads are in the second positional state.

2. The interconnect of claim 1, wherein the compression component further comprises a third orientation, wherein when the compression component is in the third orientation, the at least a portion of the plurality of signal contacts or the at least a portion of the plurality of non-electrical pads are in a test state to provide for diagnostic testing of the interconnect.

3. The interconnect of claim 1, further comprising a conductor to facilitate a transfer of power between a first level of the interconnect to a second level of the interconnect.

4. The interconnect of claim 1, further comprising an interconnect indicator to provide a visual indication of a status of the interconnect.

5. The interconnect of claim 1, further comprising a torque limiter to limit overtorqueing of the interconnect.

6. The interconnect of claim 1, wherein the first positional state comprises an extended position and the second positional state comprises a retracted position.

7. The interconnect of claim 6, wherein the extended position for the at least a portion of the plurality of signal contacts provides an electrical path from the integrated truss system to one of the plurality of signal contacts.

8. The interconnect of claim 6, wherein the extended position for the at least a portion of the plurality of non-electrical pads provides the mechanical securement of the interconnect to the integrated truss system.

9. The interconnect of claim 1, wherein a portion of the plurality of signal contacts comprise a shaped surface configured to reduce lateral movement of the portion of the plurality of signal contacts against a portion of truss contacts of the integrated truss system.

10. The interconnect of claim 9, wherein the shaped surface comprises teeth configured to engage complimentary teeth of the portion of truss contact.

11. The interconnect of claim 1, wherein the plurality of signal contacts and the plurality of non-electrical pads are disposed within one or more truss sleeves of the integrated truss system.

12. The interconnect of claim 11, wherein the one or more truss sleeves encircle a central axis.

13. The interconnect of claim 12, further comprising an expander configured to provide an outward force on the one or more truss sleeves to secure the truss sleeves in the integrated truss system.

14. The interconnect of claim 13, wherein the expander comprises a compression bolt, an interconnect installation device, or a spring mechanism.

15. The interconnect of claim 1, further comprising threads configured to secure the interconnect into the integrated truss system.

16. The interconnect of claim 15, further comprising a lock configured to further secure the interconnect in the integrated truss system.

17. A method for transferring a signal between levels of an integrated truss system and an interconnect, comprising:
inserting the interconnect into an aperture passing through a first truss level and a second truss level of the integrated truss system, wherein the interconnect includes:
a compression component having a length, a first orientation, and a second orientation;
a plurality of signal contacts having a first positional state and a second positional state, the plurality of signal contacts being disposed adjacent to a portion of an outer surface of the interconnect and along at least a portion of the length; and
a plurality of non-electrical pads having the first positional state and the second positional state, the plurality of non-electrical pads being interspersed between at least a portion of the plurality of signal contacts for mechanical securement;
moving the compression component from the first orientation to the second orientation, wherein when the compression component is in the first orientation, at least a portion of the plurality of signal contacts or at least a portion of the plurality of non-electrical pads are in the first positional state, and wherein when the compression component is in the second orientation, the at least a portion of the plurality of signal contacts or the at least a portion of the plurality of non-electrical pads are in the second positional state;
receiving a signal from the first truss level into a first signal contact of the interconnect;
transferring the signal from the first signal contact to a second signal contact of the interconnect; and
outputting the signal from the second signal contact to the second truss level.

18. The method of claim 17, wherein the signal is received from a truss contact.

19. The method of claim 17, wherein transferring the signal from the first interconnect level to a second interconnect level comprises transferring the signal from the first interconnect level to a conductor of the interconnect.

20. An electrical system, comprising:
an integrated truss system comprising a plurality of insulating levels for electrical isolation and a plurality of transfer levels for transferring energy; and
an interconnect comprising
a compression component having a length, a first orientation and a second orientation,
a plurality of signal contacts having a first positional state and a second positional state, the plurality of signal contacts being disposed adjacent to a portion of an outer surface of the interconnect and along at least a portion of the length, and
a plurality of non-electrical pads having the first positional state and the second positional state, the plurality of non-electrical pads being interspersed between at least a portion of the plurality of signal contacts for mechanical securement,
wherein when the compression component is in the first orientation, at least a portion of the plurality of signal contacts or at least a portion of the plurality of non-electrical pads are in the first positional state, and
wherein when the compression component is in the second orientation, the at least a portion of the plurality of signal contacts or the at least a portion of the plurality of non-electrical pads are in the second positional state.

21. The electrical system of claim 20, further comprising a passive component for conditioning signals, wherein the passive component comprises a resistor or a diode.

22. The electrical system of claim 20, wherein the energy comprises a signal, light, or thermal energy.

23. The electrical system of claim 20, wherein the plurality of signal contacts and the plurality of non-electrical pads are in a stacked arrangement along at least a portion of the length of the compression component, wherein at least a portion of the plurality of signal contacts are separated by at least one of the plurality of nonelectrical pads.

24. The electrical system of claim 20, wherein the compression component comprises an oblong cross-sectional shape that transfers a rotational force applied to the compression component to a lateral force applied to the plurality of signal contacts or the plurality of non-electrical pads, or combinations thereof.

25. The electrical system of claim 20, wherein the plurality of signal contacts comprise an oblong shape characterized by recesses and a contact void.

26. The electrical system of claim 25, wherein the recesses engage the compression component to help secure the compression component in first positional state or the second positional state and the contact void provides for at least one of extension and retraction of the plurality of signal contacts.

27. The electrical system of claim 25, wherein a portion of at least one of the plurality of signal contacts proximate to the contact void is configured to be magnetized to place the at least one of the plurality of signal contacts in an engaged position to provide for an electrical path from the integrated truss system to the at least one of the plurality of signal contacts and demagnetized to place the at least one of the plurality of signal contacts in a disengaged position to remove the electrical path.

* * * * *